United States Patent [19]
Noreen

[11] Patent Number: 5,797,997
[45] Date of Patent: *Aug. 25, 1998

[54] OXYGEN PRODUCING THERMOPHOTOVOLTAIC SYSTEMS

[76] Inventor: Darryl L. Noreen, 551 Observer Hwy. #10 B, Hoboken, N.J. 07030

[*] Notice: The term of this patent shall not extend beyond the expiration date of Pat. No. 5,512,108.

[21] Appl. No.: 640,318

[22] Filed: Apr. 30, 1996

Related U.S. Application Data

[63] Continuation-in-part of Ser. No. 315,062, Sep. 29, 1994, Pat. No. 5,512,108.

[51] Int. Cl.$^6$ ............................................. H02N 6/00
[52] U.S. Cl. ...................... 136/253; 204/252; 204/265; 204/266; 205/634
[58] Field of Search ........................ 136/253; 205/634; 204/252, 265–266

[56] References Cited

U.S. PATENT DOCUMENTS

| | | | |
|---|---|---|---|
| 4,034,557 | 7/1977 | Cerkanowicz | 60/39.06 |
| 4,035,131 | 7/1977 | Cerkanowicz | 431/6 |
| 4,043,308 | 8/1977 | Cerkanowicz | 123/143 R |
| 4,285,193 | 8/1981 | Shaw et al. | 60/39.06 |
| 4,584,426 | 4/1986 | Nelson | 136/253 |
| 4,707,560 | 11/1987 | Hottel et al. | 136/253 |
| 4,726,181 | 2/1988 | Pillsbury | 60/39.06 |
| 4,730,599 | 3/1988 | Kendall et al. | 126/91 A |
| 4,731,989 | 3/1988 | Furuya et al. | 60/39.05 |
| 4,750,943 | 6/1988 | Nelson | 136/253 |
| 4,776,895 | 10/1988 | Goldstein | 136/253 |
| 4,787,208 | 11/1988 | DeCorso | 60/723 |
| 4,793,799 | 12/1988 | Goldstein et al. | 431/79 |
| 4,836,862 | 6/1989 | Pelka et al. | 136/253 |
| 4,850,862 | 7/1989 | Bjerklie | 432/182 |
| 4,900,368 | 2/1990 | Brotz | 136/253 |
| 4,906,178 | 3/1990 | Goldstein et al. | 431/79 |
| 4,948,365 | 8/1990 | Yuen | 432/103 |
| 4,976,606 | 12/1990 | Nelson | 431/79 |
| 5,011,566 | 4/1991 | Hoffman | 156/643 |
| 5,044,939 | 9/1991 | Dehlsen | 432/25 |
| 5,057,162 | 10/1991 | Nelson | 136/253 |

(List continued on next page.)

OTHER PUBLICATIONS

Suitor, et al., "Oxygen Production Using Solid–State Zirconia Electrolyte Technology", Technology 2000 Conference, Washington, D.C. (Nov. 27–28, 1990).

Marner, et al., "A Model to Predict the Removal of Oxygen from Air Using a Zirconia Solid Electrolyte Membrane", *Proceedings of the 23rd Intersociety Energy Conversion Conference*, vol. 2, pp. 265–271 (1988).

Suitor, et al., "Oxygen Separation From Air Using Zirconia Solid Electrolyte Membranes", *Proceedings of the 23rd Intersociety Energy Corporation Conference* vol. 2, pp. 273, 277 (1988).

(List continued on next page.)

*Primary Examiner*—Aaron Weisstuch
*Attorney, Agent, or Firm*—Hoffmann & Baron

[57] ABSTRACT

A thermophotovoltaic (TPV) system converts thermal or radiant heat into oxygen and electricity for use in a variety of applications. The TPV system and method for efficiently generating-oxygen and electric power through the combustion of fossil fuels with little or no nitrogen oxides or other undesirable combustion by-products. Combustion temperatures are kept at about 1,700° C. or lower while burning a reactant mixture having an air/fuel ratio of greater than about 3:1. Heat from combustion products can be recycled and recuperated without concern for excessive increases in combustion temperature and subsequent combustor/emitter degradation. The generated oxygen may be harvested for commercial use as well as for introduction back into the TPV system.

As a by-product of this improved TPV system, we have discovered an inexpensive, environmentally-friendly, and commercially viable method for generating pure oxygen molecules and electricity.

25 Claims, 10 Drawing Sheets

U.S. PATENT DOCUMENTS

| | | | |
|---|---|---|---|
| 5,080,577 | 1/1992 | Bell et al. | 431/7 |
| 5,141,432 | 8/1992 | Bell et al. | 431/7 |
| 5,160,254 | 11/1992 | Bell et al. | 431/7 |
| 5,298,298 | 3/1994 | Hoffman | 428/34.4 |
| 5,356,487 | 10/1994 | Goldstein et al. | 136/253 |
| 5,512,108 | 4/1996 | Noreen | 136/253 |

OTHER PUBLICATIONS

"Cell Theory and Design", *Photovoltaics Technical Information Guide*, Second Edition, pp. 10–20 (1988).

Hsu, et al., "Experimental and Numerical Study of Premixed Combustion within Nonhomogeneous Porous Ceramics", *Combust. Sci. and Tech.*, 90, pp. 149–172 (1993).

Xiong, "Experimental Study of Ultra–Low Emission Radiant Porous Burner", Presented ath the AFRC 1991 Spring Members Only Meeting, Hartford, CT, Mar. 18–19, 1991.

Wright, et al., "Dense–Ceramic Oxygen Conducting Membranes", *Advanced Oxygen Separation Membranes*, pp. 33–45 (1990).

Suitor, et al., *Development of Alternative Oxygen Production Source Using a Zirconia Solid Electrolyte Membrane*, Jet Propulsion Laboratory, California Institute of Technology Technical Progress Report for Fiscal Years 1987, 1988 and 1989 (Aug., 1990).

Fraas, "III–V Materials for Photovoltaic Applications" *MRS Bulletin*, (Oct. 1993).

Wanlass, et al., *Epitaxial InP and Related III–V Compounds Applied to Solar Cells*, Presented at the 1st International Conference on InP, Norman, OK (Mar., 1989).

Wanlass, et al., *InP/$Ga_{0.47}In_{0.53}As$ Monolithic, Two–Junction, Three–Terminal Tandem Solar Cells*, presented at the SPRAT Conference, NASA Lewis REs. Center (Nov. 1989).

Wanlass, et al., "Practical Consideration in Tandem Cell Modeling", *Solar Cells*, 27, pp. 191–204 (1989).

Wanlass, et al., *Development of High–Performance GaInAsP Solar Cells for Tandem Solar Cell Applications*, presented at the 21st IEEE Photovoltaic Specialists Conference, Orlando, FL (May 21–25, 1990).

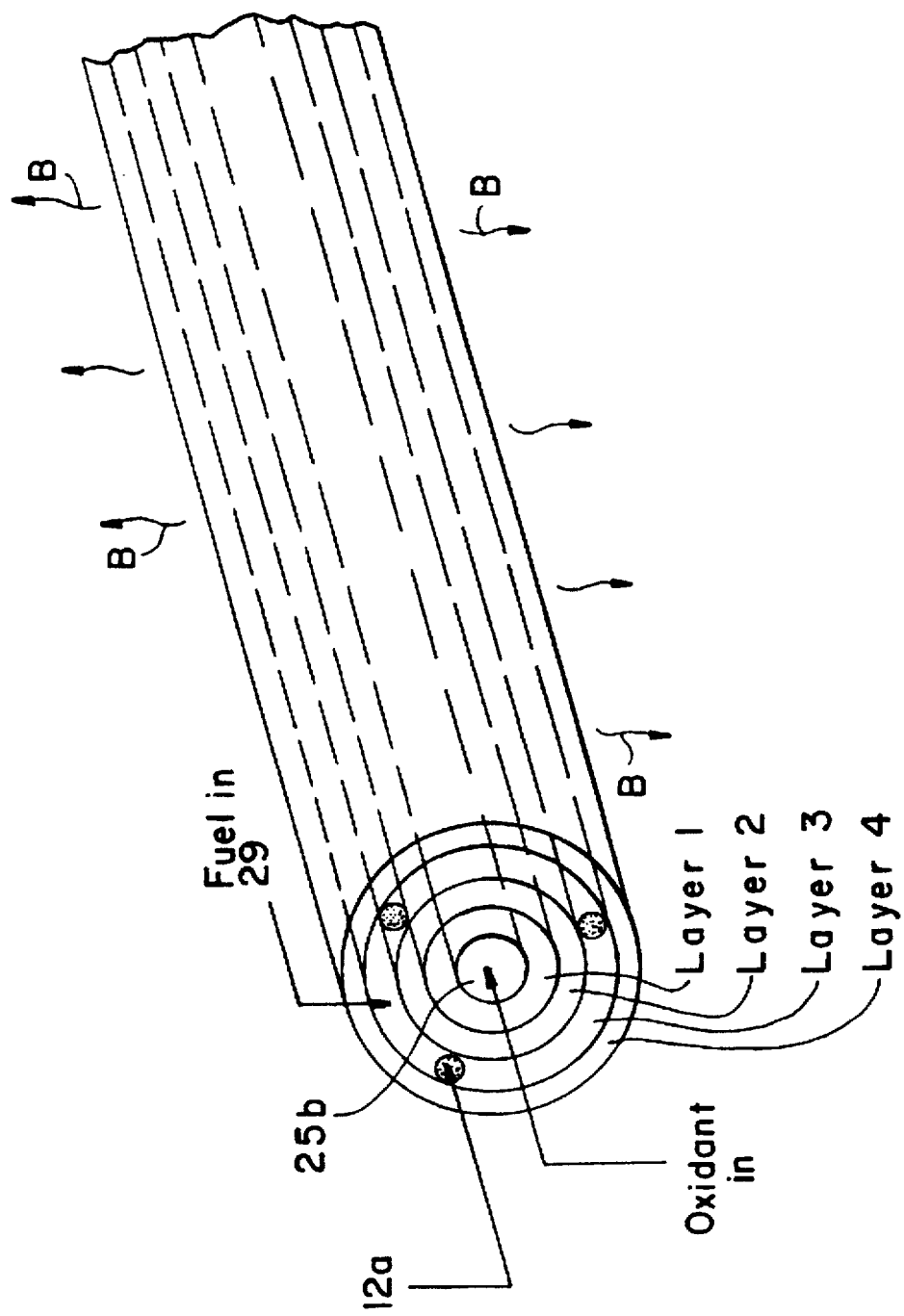

OXYGEN PRODUCING THERMOPHOTOVOLTAIC SYSTEMS

CROSS-REFERENCE TO RELATED APPLICATION

This application is a continuation-in-part of application Ser. No. 08/315,062, filed on Sep. 29, 1994, now U.S. Pat. No. 5,512,108 issued Apr. 30, 1996. The parent application cited above is herewith incorporated by reference.

FIELD OF THE INVENTION

This invention relates to thermophotovoltaic (TPV) systems for converting thermal or radiant heat into electricity for use in a variety of applications. More particularly, this invention relates to co-generating oxygen and electricity in such a TPV system. This invention also includes a method for efficiently generating electric power and oxygen through the combustion of fossil fuels with little or no nitrogen oxides or other undesirable combustion by-products. Combustion temperatures are kept at about 1,700° C. or lower while burning a reactant mixture having an air/fuel ratio of greater than about 3:1. Heat from combustion products can be recycled and recuperated without concern for excessive increases in combustion temperature and subsequent combustor/emitter degradation. The electricity generated is sufficient to power the oxygen generation process. The oxygen generated may be used as an oxidant in the TPV system and the surplus can be harvested for commercial applications.

BACKGROUND OF THE INVENTION

Thermophotovoltaic generators for converting radiant energy from a thermal source into electricity have been known in the art. Conventional thermophotovoltaic generators generally involve a high temperature burner or radiator which becomes incandescent and illuminates thermophotovoltaic cells which convert a portion of the incident radiation into electricity. Numerous patents are directed to various burners and porous support media used in the combustion chamber. For example, U.S. Pat. Nos. 5,141,432; 5,160,254 and 5,080,577, all to Bell, et al., relate to an apparatus and method for conducting combustion within a porous matrix. This apparatus and method involves combusting a mixture of fuel and air in successive zones, the first zone where the mixture is fuel-lean, the second zone which receives the combustion products of the first zone and where the mixture is adjusted to be fuel-rich, and a third zone for receiving the combustion products of the second zone and where the mixture is adjusted to again be fuel-lean. Each of the zones is filled with a porous matrix having void spaces in which substantially all of the combustion occurs. The porous matrix comprises a foam made from zirconia or silica-alumina, or a packed bed comprising balls, saddles or rods.

Conventional TPV combustors or generators suffer from low efficiency, i.e. 10 to 15% efficiency, primarily due to an inability to recycle or recuperate the heat lost without overheating the system or subjecting the emitter materials to temperatures beyond their operating range. For example, U.S. Pat. No. 4,836,862 to Pelka describes thermal efficiencies which are relatively high, i.e. 72%, but this is achieved at temperatures exceeding 1900° C. These temperatures are problematic not only from a materials limitation standpoint, but also from an emissions standpoint, whereby high $NO_x$ is created. The Pelka patent attempts to compensate for high $NO_x$ emissions through the use of specific catalysts. Due to the high temperatures, however, only specific ceramic oxides are useful. These materials must further be configured into specific geometric shapes, e.g. spheres, in order to tolerate thermal contraction and expansion forces which occur during the cycling of heat throughout the emitter bed.

However, particle beds create a tortuous path through which the heated gases, i.e. combustion products, must move. Movement through such particle beds requires increased consumption of energy, since enough pressure must be exerted to physically push the gases through the bed. Thus, although these ceramic emitter geometries ameliorate thermal expansion and contraction forces, they create another problem in the form of pressure drops across the emitter and/or combustion chamber. This drop in pressure creates power consumption inefficiencies, whereby, for example, more fan power or energy is required to move the combustion products through the combustion chamber.

Conventional air/fuel ratios used in combustion systems generally range between air/fuel ratios of 1:1 up to about 3:1. The air/fuel ratio is the ratio of the mass of air to fuel prior to combustion. Ratios greater than 3:1 are known to cause instability in the combustion flame which causes the flame to extinguish. Higher ratios of air to fuel, i.e., lean-burn ratios where significantly more oxygen and mass is present, would allow for maximum conversion of chemical energy to radiant energy. This in turn would result in a higher conversion of thermal energy to electricity, with the result being higher power densities and overall efficiency being greatly increased. Such lean-burn ratios have, heretofore, not been possible in conventional TPV systems. The present invention is also directed at providing for stabilized combustion of exceptionally high, lean-burn ratios at temperatures within the temperature resistance properties of current materials.

Combustion efficiency, however, is not the only problem to be solved in thermophotovoltaic processes. The creation of harmful by-products, i.e. $NO_x$, is to be avoided and the challenge has been to create an apparatus and methodology which allows for efficient combustion, high density output with low $NO_x$ and carbon monoxide emissions. The present invention has disclosed a means of increasing the air/fuel ratio, which to a large degree governs the operating temperatures and hence the emission results. For low $NO_x$, the mixture should be "lean" as opposed to "rich". These terms refer to ratios greater than 1.0 and less than 1.0, respectively. Whereas conventional metal combustors operate on rich or slightly lean ratios, more recent ceramic combustors allow for leaner mixtures and hence lower operating temperatures. As the operating temperature of the burner drops, less $NO_x$ emissions are produced. At leaner ratios, lower temperatures are possible, but the energy emitted also drops. Thus, it is apparent that there is a delicate and complex balance which must be achieved whereby high power density, i.e. high energy output, is obtained using a lean-burn combustion technique.

Heretofore, it has not been possible to maintain a stabilized combustion state using air/fuel ratios greater than about 3:1 without having a combustion temperature in excess of the temperature resistance capabilities of current ceramic materials. Additionally, to be an effective energy producing system, radiant and convective energy which is not harnessed should be recovered and returned to the system. Most preferably such recovered heat should be used to preheat incoming reactants, e.g. air and fuel. Preheating of reactants however is known to increase combustion temperature which beyond certain limits destroys the ceramics used in the system.

Traditional methods of oxygen generation, such as for example, cryogenic distillation and pressure-swing adsorption are expensive, hard to scale up, and relatively inefficient. Thus, new methods of generation of pure oxygen have been sought.

Such a new method is described in JPL Publication D-7790 entitled, "Development of Alternative Oxygen Production Source Using a Zirconia Solid Electrolyte Membrane" (August 1990). In this publication, the Jet Propulsion Laboratory has described an oxygen production plant utilizing a zirconia module for oxygen separation. This technology is based on the ion conduction capability of zirconia. For example, the crystal lattice structure of a yttria-stabilized zirconia (YSZ) material provides conduction sites for transport of oxygen ions through the material. In this example, an electrical potential is the driving force for transporting these ions across the YSZ material. Such a procedure, however, requires large amounts of energy and temperatures in excess of 1000° C.

The prior art has failed to appreciate the potential for combining oxygen generation with the ability to generate electricity in traditional TPV systems.

The prior art has also failed to fully appreciate the need for various components of a TPV system to function in an integrated fashion. Consideration has not been given to maximizing energy output as a function of the total system, as well as minimizing energy losses in transferring energy between components. Instead, the art has focused on improving particular components, for example, a combustor or photocell, independent of their relationship to the efficiency and power density of the system as a whole. By building a system which addresses the problems associated not only with each individual TPV component, but also with their integration into a total system, the present invention represents a departure from the prior art. In addition to the unique, synergistic combination of system components and steps, improvements to various individual components represent other embodiments of the present invention.

As a by-product of this improved TPV system, we have discovered an inexpensive, environmentally-friendly, and commercially viable method for generating pure oxygen molecules and electricity.

Thus, it is clear that there is a need for such a system for co-generating pure oxygen and electricity. The present invention incorporates a unique combination of components to define such a system, components and apparatus, as well as methods of achieving same.

SUMMARY OF THE INVENTION

The present invention relates to a system for co-generating pure oxygen and electricity which includes a membrane means for separating pure oxygen from a gaseous mixture and a thermophotovoltaic (TPV) means for generating electricity sufficient to separate the pure oxygen from the gaseous mixture. This TPV means includes an insulated housing containing a porous ceramic matrix. This housing also has a combustion zone for supporting combustion of a reactant mixture and for emitting radiant energy in response to the combustion. Also provided is means for injecting an incoming reactant mixture into the ceramic matrix. An ignition means is also included that ignites the reactant mixture and propagates a combustion flame within the combustion zone. In addition, a photocell means for receiving and converting the radiant energy into electricity is provided. The TPV means also includes a heat recovery means for recovering the heat of combustion and for preheating the reactant mixture. This invention also includes a means for transferring the TPV generated electricity to the membrane means for separating pure oxygen from the gaseous mixture. Finally, a means for collecting, storing and delivering the pure oxygen is provided.

The TPV systems and methods of the present invention can be used for military and civilian oxygen and power generation applications. The present invention also contemplates thermal to electric conversion efficiencies greater than about 30% with little or no $NO_x$ emissions.

In another embodiment of the invention, a system for co-generating pure oxygen and electricity is provided that includes a housing that contains an emitter for emitting radiant energy in response to combustion and a combustion zone for supporting combustion of at least one reactant. Also included in this embodiment is a means for injecting reactant into the combustion zone. An ignition means to ignite the reactant and to propagate a combustion flame within the combustion zone is also provided. In addition, a photocell means for receiving and converting the radiant energy into electricity is provided. Also provided is a heat recovery means for recovering the heat of combustion and for preheating a reactant, an oxidant, or a mixture thereof. In addition, there is provided a membrane means for separating pure oxygen from a gaseous mixture and for delivering a portion of the oxygen as an oxidant to a TPV means. In order to recover any excess oxygen that is produced therefrom, a means for recovering this excess oxygen from the membrane means is provided.

In yet another embodiment of the present invention, a device for co-generating pure oxygen and electricity in a TPV system is provided. This device includes an oxygen separation means for separating oxygen from a gaseous mixture, a means for moving this oxygen across the separation means, a TPV means for generating electricity to drive the oxygen separation means, and a means for recovering, storing, and delivering the oxygen.

In this embodiment of the invention, the oxygen separation means further includes an oxygen conductor having a crystal lattice structure and a means for producing oxygen vacancies within the crystal lattice structure so that oxygen ions may be separated from the gaseous mixture.

The oxygen conductor may be selected from either solid electrolyte materials or from mixed conducting materials. Preferably, the electrolyte materials are selected from dense ceramic solid electrolyte membranes. Also, the electrolyte membranes may be selected from zirconium oxide, bismuth oxide, aluminum oxide, and magnesium oxide. The oxygen vacancies in the oxygen conductor materials may be generated by addition of dopant compounds such as for example CaO, $Y_2O_3$ or mixtures thereof. In addition, the mixed conductor materials may be selected from the following group: $CaTi_{0.7}Al_{0.3}O_{3-x}$, $La_{0.7}Ca_{0.3}AlO_{3-x}$, $CaTi_{0.95}Mg_{0.05}O_{3-x}$, $La_{1-x}Sr_xCoO_{3-\delta}$, and $La_{1-x}Sr_xCo_{1-y}Fe_yO_{3-\delta}$.

In one embodiment of this invention, a pressure differential may be applied to the means for moving oxygen across the separation means. Alternatively, an electric current may be applied to the means for moving oxygen across the separation means. In this embodiment, the electric current is generated from a TPV means. This TPV means includes an insulated housing that contains a porous ceramic matrix and a combustion zone for supporting combustion of a reactant and for emitting radiant energy in response to the combustion. The TPV means also includes a means for injecting an incoming reactant mixture into the ceramic matrix. The TPV means also includes an ignition means for igniting the reactant mixture and propagating a combustion flame within the combustion zone. In addition, the TPV means includes a photocell means for receiving and converting the radiant energy into electricity. Finally, the TPV means includes a heat recovery means for recovering the heat of combustion and for preheating the reactant mixture.

In yet another embodiment of the present invention, there is provided a TPV system that includes a means for co-generating pure oxygen and electricity. This means for generating pure oxygen includes a dense ceramic solid electrolyte membrane interspersed with dopants. This means for generating pure oxygen also includes a gradient means for moving oxygen across the membrane. Also included in this means for generating pure oxygen is a means for supplying electricity to the means for generating pure oxygen.

In this embodiment, the electrolyte material may be zirconium oxide, bismuth oxide, cerium oxide and perovskites. In addition, the dopants of this invention may be calcium, yttrium, and ytterbium.

An external force, for example, a gradient means is necessary to drive the oxygen generation in this system. Thus, in this embodiment, the gradient means may be either a pressure gradient or an electrical gradient.

In this embodiment, the TPV means for generating electricity includes an insulated housing that contains a porous ceramic matrix. This housing includes a combustion zone for supporting the combustion of a reactant mixture and for emitting radiant energy in response to the combustion. Also provided is a means for injecting an incoming reactant mixture into the ceramic matrix. An ignition means for igniting the reactant mixture and propagating a combustion flame within the combustion zone is also provided. A photocell means is also included for receiving and converting the radiant energy into electricity. Also included is a heat recovery means for recovering the heat of combustion and for preheating the reactant mixture.

In yet another embodiment of the invention, a TPV system for co-generating pure oxygen and electricity is provided. In this system, there is included a chamber containing an emitter made of a material selected from the group consisting of ceramic, metals and combinations thereof. Also included in this chamber is a combustion zone for supporting combustion of at least one reactant. This system also includes a means for providing a reactant mixture into the combustion zone. Also provided in this system is an ignition means for igniting the reactant mixture and propagating a combustion flame within the combustion zone. In addition, a photocell means is included with this system for receiving and converting radiant energy into electricity. A heat recovery means is also provided with this system for preheating a reactant, an oxidant, or a mixture thereof. A means for generating pure oxygen is also included in this system. Lastly, this system includes a means for utilizing the electricity to drive the oxygen generation means.

In this system, the means for generating oxygen molecules is further defined. This means for generating oxygen molecules includes a membrane means for separating pure oxygen molecules from a gaseous mixture. Also included is an electro-gradient means for moving the oxygen molecules across the membrane. This gradient means includes a means for applying a voltage to the oxygen molecules in order to dissociate and reduce the oxygen molecules to oxygen radicals. This electro-gradient is further capable of driving the oxygen radicals through the membrane from a cathode source toward and anode source. When this happens the oxygen radicals give up two electrons which then enter the anode-source and then recombine to form pure oxygen molecules. Also provided in this system is a means for selectively delivering oxygen as an oxidant in the TPV system. In addition, a means for collecting, storing and delivering the excess generated oxygen is provided.

In this embodiment, the means for generating oxygen molecules is further defined by a membrane means for separating pure oxygen molecules from a gaseous mixture, a pressure gradient means for moving the oxygen molecules across the membrane, a means for selectively delivering the oxygen as an oxidant in the TPV system and a means for collecting, storing and delivering the excess generated oxygen. In the system, the oxidant may be the pure oxygen generated by the means for generating pure oxygen.

In yet another embodiment of this invention, a method of co-generating pure oxygen molecules and electricity is provided. This method includes a TPV system for generating electricity, separating oxygen molecules from a gaseous mixture by diffusion through a cathode to a cathode-electrolyte interface, applying a voltage generated from the TPV-generated electricity in order to disassociate and reduce the oxygen molecules to oxygen ions, moving the oxygen ions through the membrane toward an anode, reassociating the oxygen ions into pure oxygen molecules and charging the anode with two electrons that are liberated from each oxygen ion during this reassociation. These reassociated oxygen molecules can be used as oxidants in the TPV system. In addition, the excess reassociated oxygen molecules may be collected for commercial application.

In a still further embodiment of this invention, a method of co-generating pure oxygen molecules and electricity is provided. This methods includes providing a TPV system for generating electricity and separating oxygen molecules from a gaseous mixture by application of a pressure gradient across a mixed conduction membrane so that the oxygen molecules diffuse and are absorbed onto the membrane. At the same time, oxygen is dissociated into oxygen ions. The oxygen ions are then moved through vacancies in a crystal lattice of the membrane. The oxygen ions are then reassociated into pure oxygen molecules. These oxygen molecules are then desorbed from the membrane. These reassociated oxygen molecules may be used as oxidants in the TPV system. In addition, the excess oxygen molecules generated from this method may be collected for commercial application.

Other objects of the present invention will become apparent and are described more fully in the following disclosure.

BRIEF DESCRIPTION OF THE DRAWINGS

FIG. 5 shows a combustor/emitter structure of tubular configuration.

DETAILED DESCRIPTION AND PREFERRED EMBODIMENTS

In one embodiment of the present invention, a combustion process for generating energy comprises: a) providing a ceramic combustor for supporting combustion of the reactant mixture having an initial temperature $T_o$; b) providing a reactant mixture having a given air/fuel ratio to a combustion zone in said ceramic combustor; c) igniting said reactant mixture to propagate a combustion flame at an initial flame temperature $Tf_o$; d) reducing said initial flame temperature $Tf_o$ to a lower temperature $Tf_1$ by providing to said ceramic combustor a reactant mixture having an air/fuel ratio above about 3:1; e) preheating said reactant mixture from said initial temperature $T_o$ to a higher temperature $T_p$ not exceeding the thermal capability of said combustor; wherein maximum conversion of chemical to radiant energy (thermal efficiency) is achieved.

Figure 1:
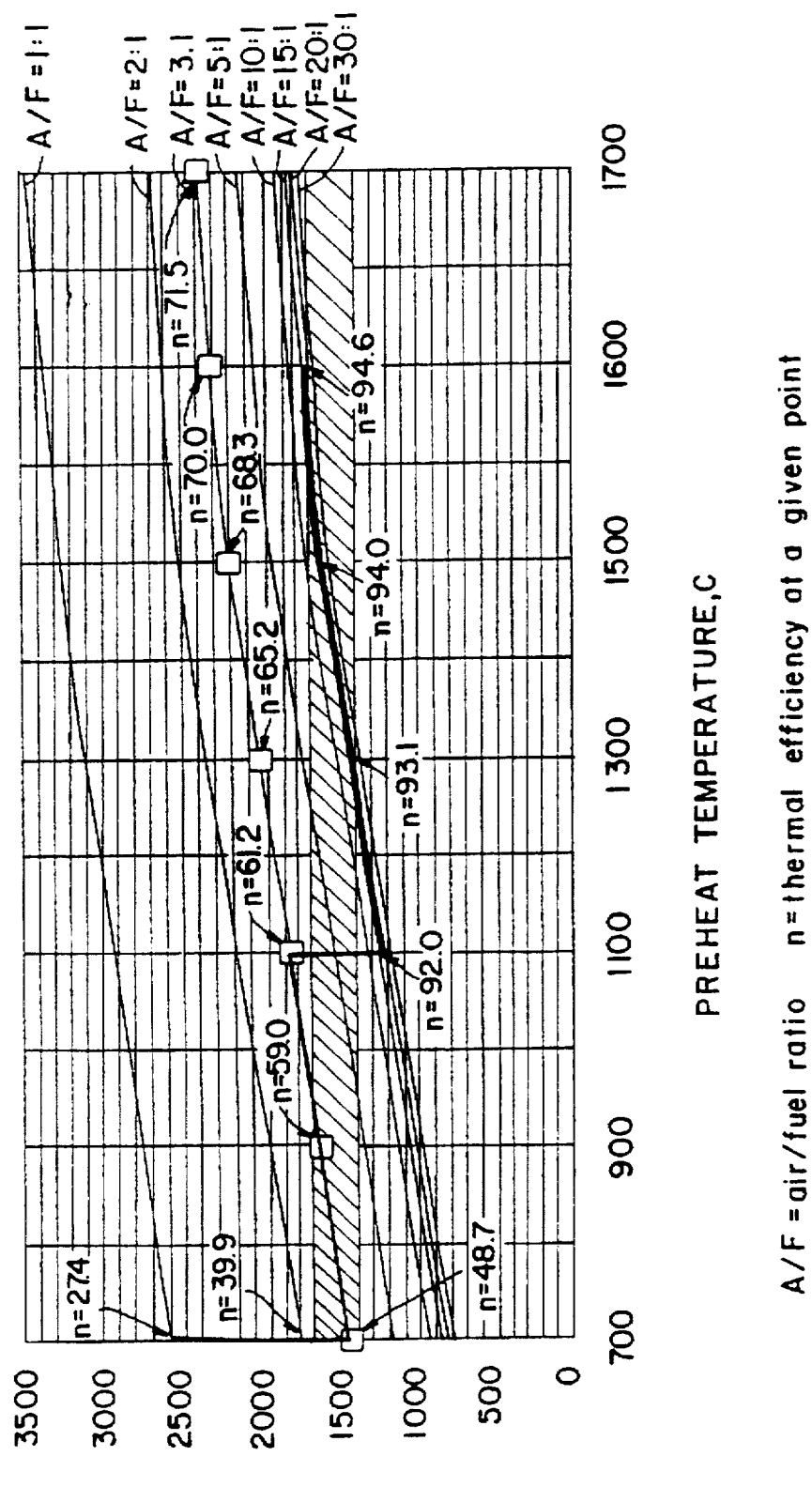
FIG. 1 is a graph showing thermal efficiency obtainable with given air/fuel ratios within operating ranges achievable with the combustion system of the present invention.

The air/fuel ratio in this embodiment of the present invention is preferably greater than about 3:1 to about 30:1. The air/fuel mixture, also referred to as the reactant mixture, may be premixed prior to introduction into the combustion zone, or mixed in the combustor/emitter itself As previously mentioned, it has not been possible to obtain stabilized combustion at air/fuel ratios in this range with combustion temperatures and preheat temperatures which were safe for commercial ceramic materials. The igniting of the reactant mixture in this embodiment is preferably achieved by photochemical emission, whereby ultraviolet wavelength sufficient to dissociate oxygen molecules is used. This wavelength is preferably in the range of about 1,400Å to about 2,400Å. The combustion temperatures, assuming an adiabatic system, as well as the preheat temperatures, can be calculated for various air/fuel ratios. Referring to FIG. 1, this graph shows the theoretical combustion temperature (Y axis) for combustion of a methane-air mixture. The theoretical combustion temperature is called the adiabatic flame temperature. The preheat temperature (X axis) on the graph is the number of °C. that are added to the reactants prior to combustion. The air/fuel ratio is the ratio of mass of air to fuel in the reacted mixture prior to combustion. Stoichiometric combustion requires 17.17 pounds of air per pound of methane. This is an air/fuel ratio of 1:1. A ratio of 3:1, for example, would be about 51.5 pounds of air per pound of methane.

FIG. 1 also shows a hatched area between about 1,400° C. and 1,700° C. which is considered a safe operating range for most commercially available ceramic materials. This is the operable range in which the materials can be used for a substantial amount of time without degrading. The present invention is also designed to operate at temperatures of greater than 1,600° C. preheat at an air/fuel ratio of 3:1 if materials in the combustor/emitter are able to withstand the 2,300° C. temperatures in the combustion zone. Presently, two ceramic materials $Al_2O_3$, which melts at about 2,000° C. and $ZrO_2$, which melts at 2,715° C. are available. Referring again to FIG. 1, the graph shows the combustion temperatures and preheat temperatures which are possible for a given air/fuel ratio, assuming ideal heat transfer, i.e. no heat loss in the system. As depicted on the graph, given an air/fuel ratio of 3:1, at preheat temperatures of greater than about 1,000° C. the combustor temperature is too high for available ceramic materials. The present invention uses air/fuel ratios of greater than 3:1, which are shown on the graph as 5:1, 10:1, 15:1, 20:1, and 30:1. As shown on the graph, substantially higher preheat temperatures can be achieved while maintaining the combustor temperature at or below the operating limit of the ceramic materials. Additionally, at various temperature points on the graph, efficiency rates have been calculated, for example, at an air/fuel ratio of 3:1, the efficiency at a combustor temperature of 1,800° C. and a preheat temperature of about 1,100° C., a 61.2% thermal to radiant efficiency is achieved. In contrast, at air/fuel ratios of 20:1, at a preheat temperature of 1,100° and a combustion temperature of about 1,200° C., a 92% thermal to radiant efficiency is achieved.

As previously mentioned, an air/fuel ratio of 3:1 is currently considered the lean flame limit and current TPV combustor systems must operate below the air/fuel ratio of 3:1. Above this ratio, the flame extinguishes for conventional combustors.

Figure 2:
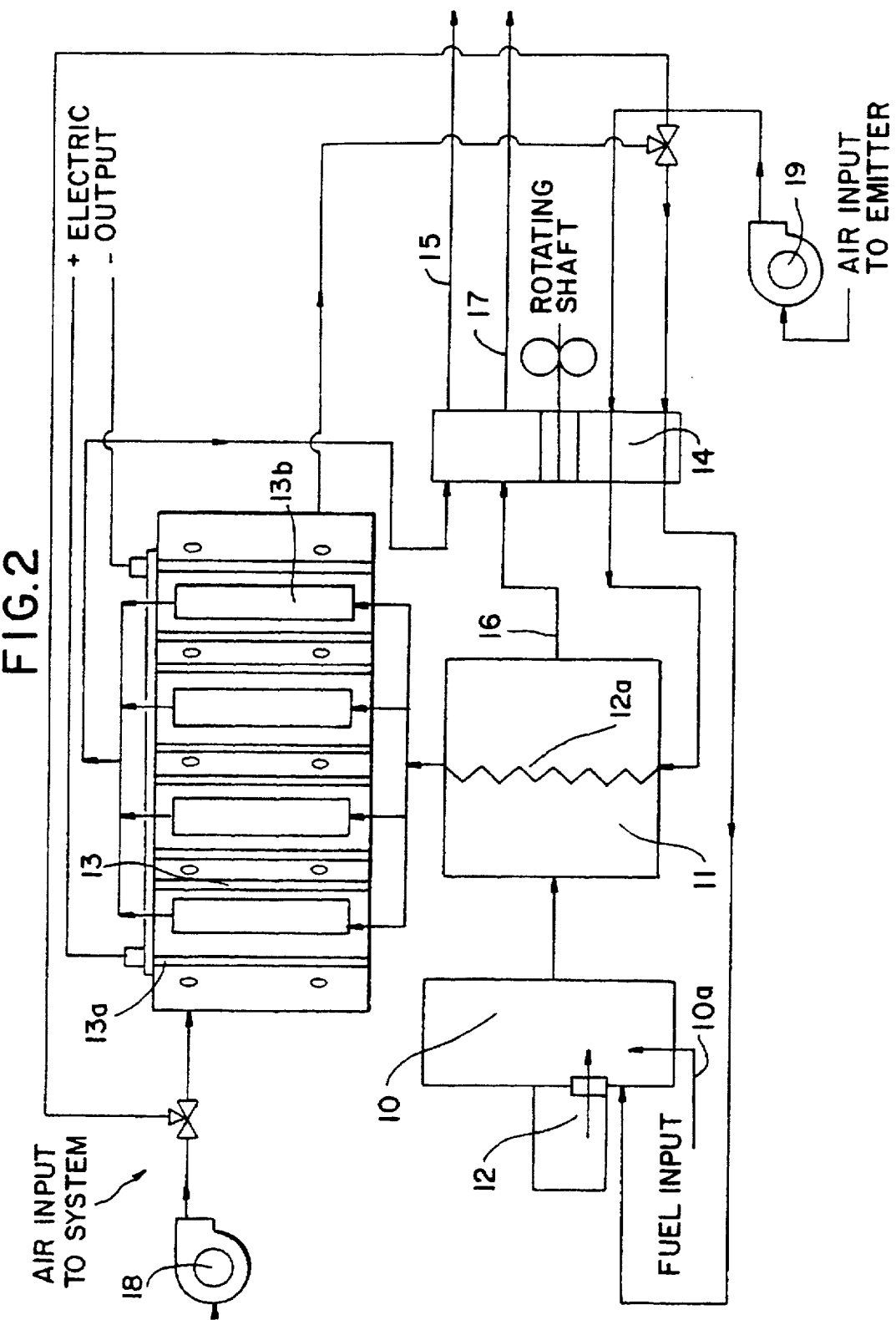
FIG. 2 shows schematically, an embodiment of the thermophotovoltaic (TPV) combustion system of the present invention.

Referring now to an embodiment of the present invention, FIG. 2 depicts a schematic of a TPV system showing its various components. As seen in the Figure, a ceramic combustor 10 receives a reactant mixture, e.g. air/fuel from line 10a. Photochemical emission source (igniter) 12 is adjacent said combustor and serves to radiate ultraviolet wavelengths sufficient to dissociate oxygen molecules in said combustor 10. Heat from said combustor 10 is captured in emitter (emitter core) 11, which as depicted in the Figure has an emitter heat exchanger 12a, adjacent thereto. Radiant energy is emitted from said emitter to a photocell array 13. Photocell array 13, as depicted in FIG. 2, has a series of photocells 13a containing ceramic emitter radiators or plugs 13b for distributing radiant energy to said photocells. Conversion of thermal energy to electrical energy takes place in said photocells and electrical output results as shown from FIG. 1. During the conversion process, heat loss from said array of photocells is recuperated into recuperator unit 14, which can be a heat wheel as shown. Low temperature exhaust is expelled from the system as shown by line 15. Additionally, line 16 shows exhaust from said emitter heat exchanger through said recuperator and is expelled via line 17. The photocells are cooled by air via fans 18. Additionally, room temperature air is fed via fan 19 through said recuperator and into said combustor where it is mixed with fuel into a reactant mixture and ignited.

Figure 3:
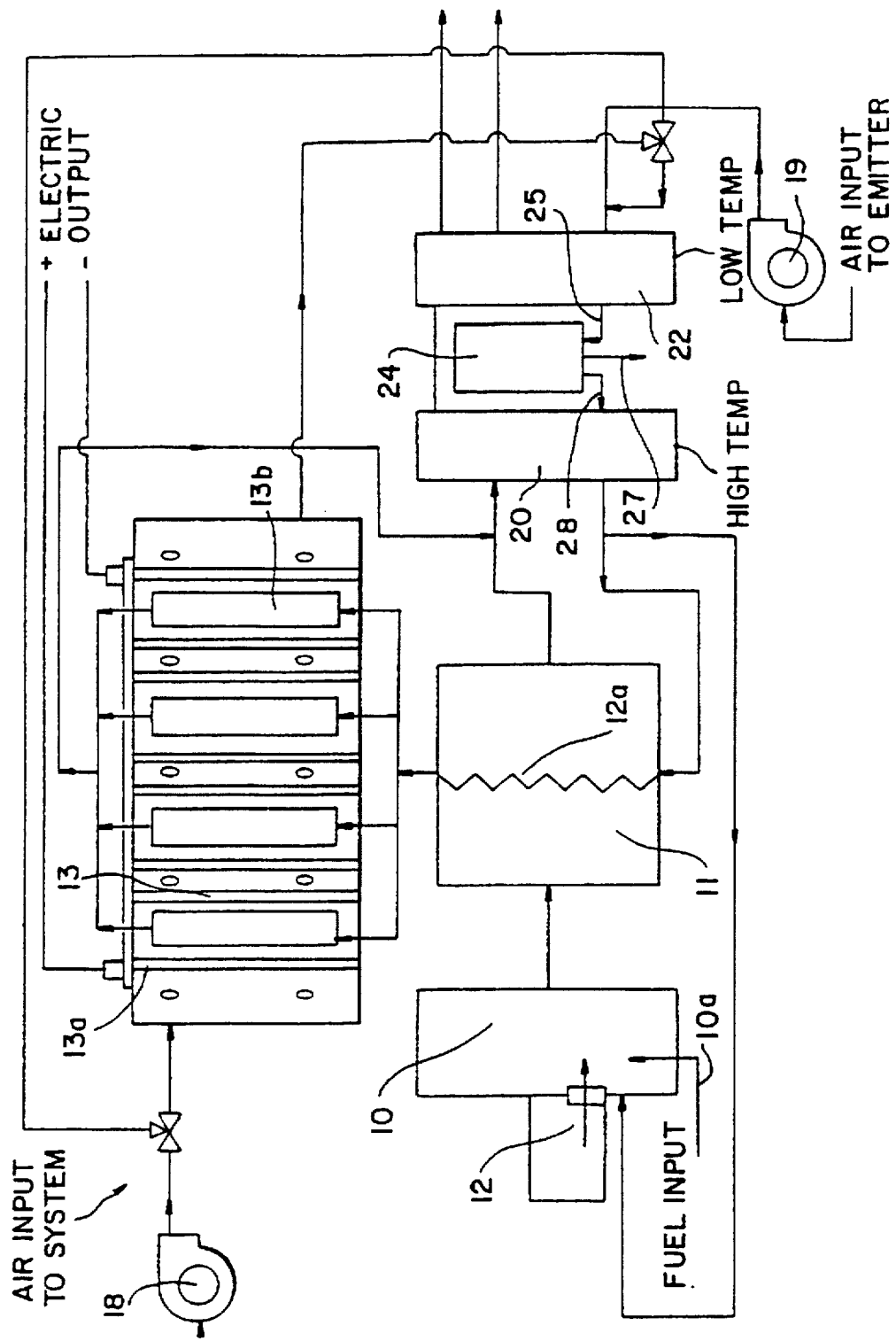
FIG. 3 shows schematically, an embodiment of the present invention substantially similar to that shown in FIG. 2, further including a pair of recuperating units and an oxygen separation membrane unit.

Turning now to FIG. 3, this schematic is substantially similar to FIG. 2, except for the addition of a pair of recuperating units 20 and 22 and an oxygen separation membrane unit 24, disposed between said recuperators. Air is passed through oxygen separation membrane unit 24 via line 25, where oxygen is selectively conducted electrolytically, under the influence of pressure, electrical current or other means. Nitrogen and other non-oxygen elements are exhausted via line 27. Pure oxygen molecules enter recuperator 20 via line 28 for preheating prior to admixture with fuel for forming a reactant mixture. As depicted in this schematic, one recuperator is a low temperature unit and the opposing recuperator is a high temperature unit.

THE EMITTER

In a most preferred embodiment, as opposed to the combustor and emitter being separate units, a porous ceramic matrix is used to serve both purposes. Such a porous ceramic matrix is more fully described herein. In a most preferred embodiment, the TPV systems of the present invention use photochemical ignition means to ignite and propagate combustion of air/fuel ratios of greater than about 3:1. Combustion can be maintained under these conditions at combustion temperatures which are between about 1,400° C. and 1,700° C., or higher, depending on the ceramic materials used and their temperature resistance. This combustion temperature range allows for preheat temperatures which are extraordinarily high without causing excessive combustion temperature. These conditions translate into extremely high thermal to radiant efficiencies as shown in the graph of FIG. 1.

The present invention contemplates use of an emitter which is capable of supporting combustion of a lean mixture of fuel and oxidant (reactants). These emitters are preferably ceramic materials which allow for combustion at temperatures from about 900° C. to about 2,000° C. over small or large surface areas. The geometry of the emitter should be designed for high thermodynamic efficiency and should be compact in size. Porous ceramic materials have been known to be useful in combustor systems. While the use of porous ceramic media, whether in the reticulated solid form or using particle beds, such as beads or frit have been known to achieve leaner flame limits than conventional burners due to the porous layers acting as radiant heat exchangers. However, extremely lean-burn has not been possible even using porous ceramics because flame stabilization and flameout has been problematic. Burning in porous media is normally done at high flame speeds, typically around 20–100 cm/sec. or more. At high air/fuel ratios, i.e., lean-burning, the flame speed and flame temperature are reduced, ultimately dropping the flame speed to about 10 cm/sec. and resulting in extinguishment of the flame. Thus, achieving flame stabilization in a porous media at higher air-to-fuel ratios (lower than 10 cm/sec flame speeds) has heretofore not been successfully accomplished. Furthermore, radial heat loss, i.e., heat loss which exceeds the heat input to the flame, is also a major contributor to flameout.

The geometry and configuration of the emitter must also be capable of achieving a constant temperature profile along its surface area, which contributes to flame stabilization. The oxidant/fuel mixture is preferably distributed evenly throughout the emitter. The emitters may be made from a variety of materials, including metals and ceramics. Due to thermal shock concerns, it is preferred that ceramics with minimum thermal shock be employed. These materials can be classified as oxides, carbides, nitrides, borides and mixtures of these materials. Thus, monolithic ceramics and composite ceramics may be employed. Specific oxides which are useful include $Al_2O_3$ (sapphire), $ZrO_2$, $MgO$, $MgAl_2O_4$ (spinel) as well as composites such as $Al_2O_5TiC$, $SiC—TiC$, $ZrO_2—MgO$, $ZrO_2—Y_2O_3$, $Al_2O_3—ArO_2$, $Al_2O_3—SiC$, and the like. These materials may be formed into conventional microstructure forms, fibrous or interlocking microstructure forms, particulate dispersions, whisker dispersions, as well as fiber reinforced forms.

The materials selected for the combustor/emitter are preferably those with a high emissivity value. Emissivity is generally fixed as an inherent property of the material. The thermal radiative output (W/cm$^2$) is a function of the emissivity of the material. Thermal radiant output power is extremely important in applications such as TPV. An ideal or black emitter has an emissivity value of 1.0. The following chart shows the emissivity of oxides as well as borides, carbides, and nitrides. It is apparent from the chart that the radiant thermal output of the latter group, which are considered black-type or gray emitters, is significantly higher than the former materials which are considered white materials. An example of a white material is $Al_2O_3$ and $ZrO_2$. An example of a black-type ceramic is SiC (silicon carbide).

| Temperature | Emissivity (W/cm$^2$) | Thermal Radiative Output Oxides |
|---|---|---|
| 1300 C. | .30 | 10.4 |
| 1400 C. | .30 | 13.3 |
| 1500 C. | .30 | 16.8 |
| 1600 C. | .30 | 20.9 |
| 1700 C. | .30 | 25.8 |
| Borides, Nitrides, Carbides | | |
| 1300 C. | .90 | 31.2 |
| 1400 C. | .90 | 39.9 |
| 1500 C. | .90 | 50.4 |
| 1600 C. | .90 | 62.7 |
| 1700 C. | .90 | 77.4 |

The ceramics may be used in the coated or uncoated form. For example, certain ceramics may be coated with another ceramic material which has a different emissivity than the substrate ceramic. The ceramic coating should preferably be matched for thermal expansion with the ceramic emitter base. In one particular embodiment, an oxide (white) ceramic having a low emissivity, e.g., 0.2–0.3, is coated with a higher emissivity material, i.e. 0.4–1.0. Coatings of oxidation resistant metal may also be used in place of the ceramic.

The ceramics of the present invention may be formed by a variety of processing techniques, including melting techniques, particulate formation techniques, vapor techniques as well as chemical techniques. In the case of emitters made from microtubes, machining techniques, etching techniques and vapor deposition techniques may be used. Preferably the microtubes are formed in accordance with fugitive tube forming processes as described in U.S. Pat. Nos. 5,011,566 and 5,298,298, herein incorporated by reference.

In addition to microtubes, porous reticulated ceramics, foams and fibrous materials as well as frit or particulate ceramics may be useful in the emitters of the present invention if properly configured. Oxidation resistance at temperatures of 1,700° C. or more are generally preferred and low or zero expansion materials which avoid or reduce thermal expansion and contraction forces, i.e. thermal shock forces, are considered to be most useful in the present invention.

In the case of ceramic materials, the geometry of the emitter may vary, depending on the application as well as the material selected. In the case of porous, reticulated ceramics, either cylindrical or planar emitters may be employed, while in a case of particle beds, the geometry will depend largely on the shape of the container in which the particle bed is situated. Foamed or fibrous ceramics are also contemplated.

Figure 4A:
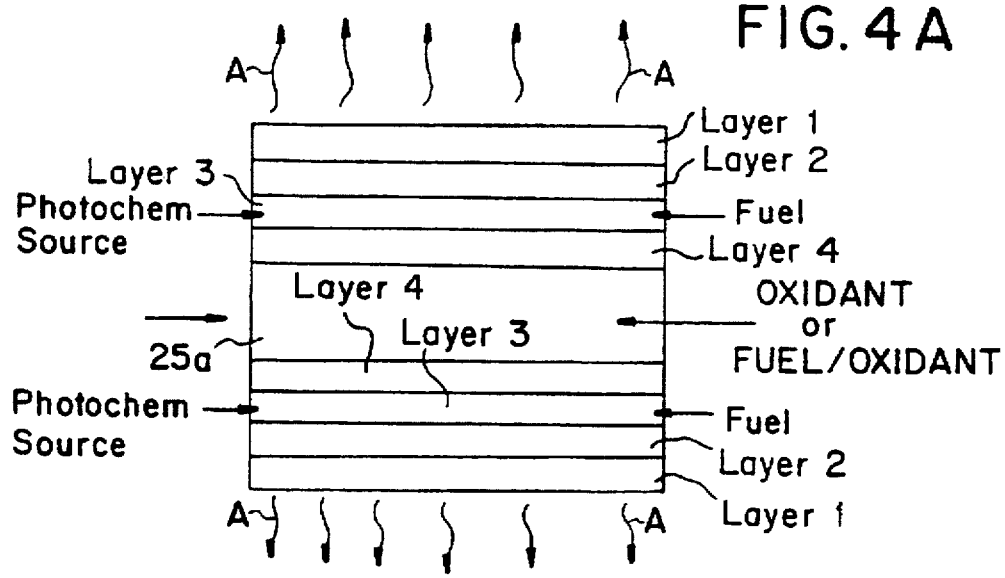
FIGS. 4a and 4b shows in schematic cross-section planar configurations of combustor/emitter structures for use in accordance with the present invention.
Figure 4B:
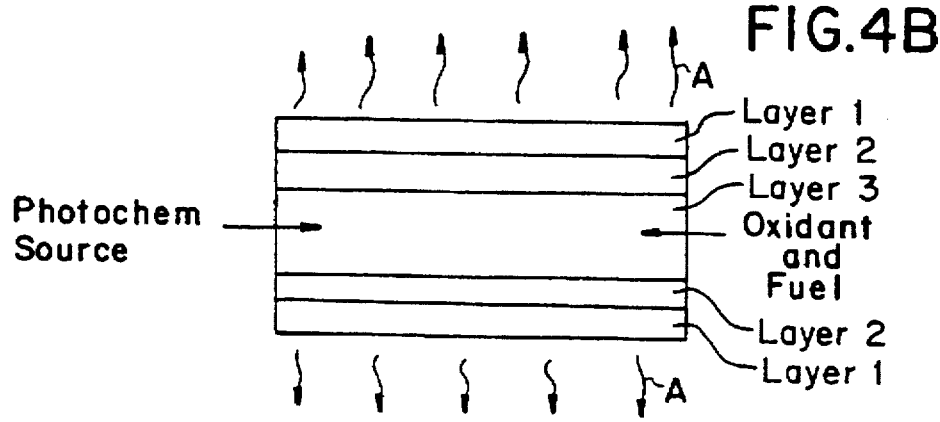

Referring to FIGS. 4 through 5, various combustor/emitter configurations are depicted. FIGS. 4a and 4b show in cross-section a planar configuration of the combustor/emitter of the present invention. FIG. 4a shows two stacks of four ceramic layers which define a combustion zone 25a.

This combustion zone may be a void manifold area of a low pores per inch ceramic material. A reactant mixture comprising an oxidant/fuel mixture, e.g. air/fuel, is injected or otherwise introduced into the combustion zone 25a. A photochemical ignition source is positioned proximate to said emitter configuration and as shown in FIG. 4a, photochemical emissions are introduced into layer 3 at one end of the emitter, while fuel is introduced at the opposite end of the same layer. Each layer of the porous ceramic matrix has a porosity which can be tailored to achieve maximum air and fuel mixing, in the case where these reactants are not premixed, as well as to provide a large area of stable burning. Thus in one embodiment, layers 4 of each of said stacks may contain a relatively high pores per inch, e.g. 20 to 100 pores per inch (ppi). This layer has a large number of small pores to help contain the gas in layer 3 above. Layer 3 may be a void or manifold area or a high porosity ceramic material for receiving fuel or reactant mixture and as a location for photochemical ignition.

As depicted in FIG. 4a, thermal energy radiates (arrows A) from the outer surfaces of layer 1 in each of the stacks. Layer 2 in this configuration serves as a preheat layer for incoming reactant mixture and preferable is a high ppi material, e.g. 20 to 100 ppi. The outer surface of layer 2, adjacent to layer 1, is the surface on which the flame resides during combustion. Finally, layer 1 serves to stabilize the flame and is preferably a low ppi material.

Figure 4C:
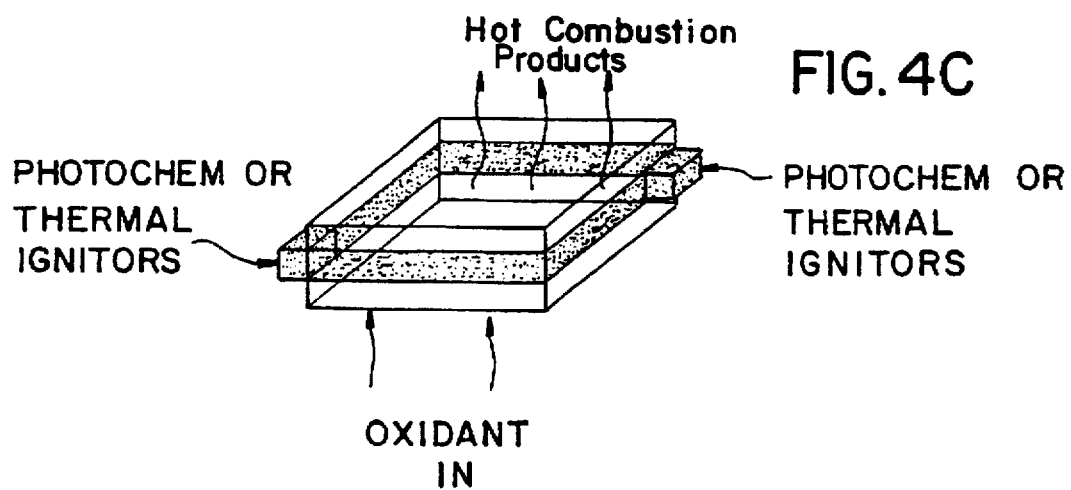
FIG. 4c shown in perspective, a portion of the planar configuration of the combustor/emitter structure of the type shown in FIGS. 4a and 4b.

FIG. 4b shows a similar configuration to FIG. 4a, only having 2 layers in each stack which define the combustion zone where the reactant is introduced and photochemical ignition ignites the reactant mixture and propagates the flame. Furthermore, FIG. 4C shows in a perspective drawing a portion of the planar configuration of the combustor/emitter structure of the types described hereinabove in FIGS. 4A and 4B.

As shown in FIG. 5, an emitter configuration having a tubular design is depicted. As shown in the Figure, an array of concentric or nested tubular layers 1–4 are present. An inner core 25b for receiving reactants mixture is shown housed inside a first layer having a relatively low number of pores per inch. This layer serves to stabilize the combustion flame. A second layer external to and housing said first layer is also shown. This layer has a higher number of pores per inch relative to said first layer. Successively external layers 3 and 4 are also shown. This design further provides for windows 27 for introduction of photochemical ignition, as well as an injection port 29 for introduction of a fuel. Combustion products and radiant energy emanates from the tubular design as shown by arrows B.

As previously mentioned, it is preferred that the emitter be comprised of an array of microtubes which can be configured in bundles or layers to maximize surface area. The formation of such microtubes can be made in accordance with above incorporated U.S. Pat. Nos. 5,011,566 and 5,298,298. These patents describe microtubes made from various materials such as carbon, ferrous metal, non-ferrous metal, ceramic, oxides, nitrides, carbides, borides, semi-conductor, glass, carbon or diamond to a microscopic fiber which is then removed. The coating material can be applied by several processes which include chemical vapor deposition, electrophoresis and electroplating. Prior to coating, the fibers are fixed in a desired preform configuration for the finished tubes and then cleaned to facilitate uniform deposition of the coating material. The coating process is carried out in a non-oxidizing or inert environment. Once the fibers are coated with the microtube material, the fibers are removed by decomposing or dissolving the fiber core, leaving the hollow microtube shell. Preferably, the fiber core is removed by heating, in an oxidizing environment, to a temperature in which the fibers oxidize quickly without damaging the tube material.

Using this sacrificial fiber method, extremely small wall thicknesses and diameters of tubes can be made. For example, virtually any configuration of tube, i.e., straight, curved, coiled, etc., can be fabricated with diameters ranging from 1–1,000 microns and wall thicknesses starting at less than 0.01 microns. The microtubes can be bundled in an array, layered in successive planar modules or configured in any useful manner, whereby the thermodynamic efficiency of the burner can be maximized. Preferably, for the emitter the microtubes have porous walls.

Although ceramic microtubes are preferred, other materials such as metals may be useful. Among the metals which are useful include aluminum, boron, cerium, chromium, cobalt, copper, gold, hafnium, iridium, iron, magnesium, manganese, molybdenum, nickel, osmium, palladium, platinum, rhenium, rhodium, ruthenium, silicone, silver, tantalum, thorium, titanium, tungsten, zirconium, uranium, and the like, the specific material from which the microtube is composed will, of course, depend on the application and the temperature requirements.

In addition to providing an extremely large surface area, the microtube emitters can easily be configured geometrically to allow an unimpeded flow of combustion gases through the tubes, thereby reducing the amount of energy required to recover and recycle hot exhaust gases. The microtube emitter allows for reduced pressure drop from one end of the combustor/emitter to the other. Due to the high density of surface area which is characteristic of the microtube, extremely compact emitters may be fashioned, which have obvious advantages over the conventional burners and emitters which are usually large and bulky. Compact size is important for many applications, particularly in vehicles such as automobiles, military equipment and other mobile applications. Additionally, the high surface area density allows for emissivity values which can be tailored depending on the material and geometry or configuration of the emitter. Since the wall thickness can be controlled through extremely fine sizes, the emitter can be made extremely light weight and therefore low mass in addition to being compact.

As previously mentioned, the geometry and configuration of the emitter should be chosen to maximize thermodynamic efficiency. This includes taking into account such considerations as the ability to maintain a relatively constant temperature throughout the emitter, the ability to stabilize a lean-burn flame, the ability to minimize pressure differentials across and from one end of the emitter to the other as well as the ability to burn at temperatures from 900° C. and higher, with particular emphasis on the temperature range of from 1,500°–1,900° C. since this range is the practical range given the temperature resistance of available materials. The combustion temperature chosen will of course vary depending on such factors as the type of material chosen, the air/fuel used, as well as the amount and temperature of recycled heat in the system. The aforementioned ceramic materials, are preferred because they offer these advantages and can be easily constructed with porous walls to further increase surface area, gaseous throughput and can operate at the aforementioned temperature ranges. These materials also offer resistance to thermal shock. With respect to thermal shock, the present TPV system additionally overcomes thermal shock by providing a unique ignition system which allows very low temperature ignition thereby providing gradual or controllable ramp-up preheat of the emitter prior to reaching maximum operating temperatures required for efficient combustion.

HEAT RECOVERY

The TPV system of the present invention requires the use of a heat recovery means which can be accomplished in a number of ways. In one embodiment, a recuperator is used to recover heat which is emitted in the form of hot exhaust gases and combustion products and returned to the combustion zone and passed through the emitter to prevent heat loss in the system. The recuperator can be in the form of a manifolded structure which is properly insulated and positioned adjacent to the emitter, for example between the emitter and the combustor. In one embodiment, the recuperator can be an integral part of the emitter and formed from a microtube configuration similar to the emitter itself. The microtube recuperator would provide excellent means for recuperating the hot exhaust and combustion products back into the combustion chamber and emitter section. High efficiency heat exchange is possible due to the extreme surface area density of recuperators made from an array of microtubes. The microtube recuperator may be configured in a counter-flow or cross-flow fashion. In a counter-flow configuration, the exhaust gases are passing in a counter-flow direction to the reactant mixture which is supporting combustion. In a cross-flow configuration, the hot exhaust gases are recuperated in a direction 90° to the flow of the reactants. Due to the ability to configure virtually any size or shape tube, including making diameters extremely small and uniform, the fixed recuperators of the present invention allow for relatively constant temperatures to be achieved throughout the emitter surface. Constant temperature is a key requirement for flame stability, particularly when lean-burn mixtures, i.e. high oxidant/fuel or air/fuel ratios are employed.

Figure 6A:
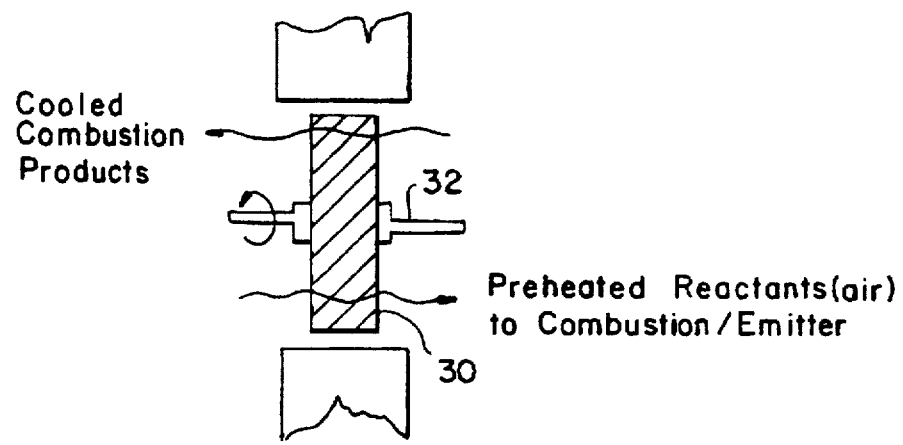
FIGS. 6a and 6b show rotary periodic flow type heat exchangers which may be used in accordance with the TPV system of the present invention.
Figure 6B:
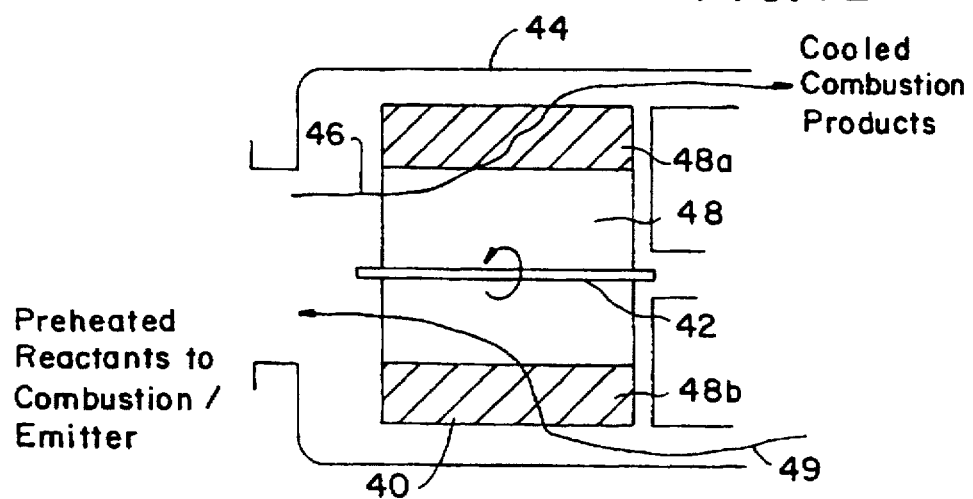
Figure 7:
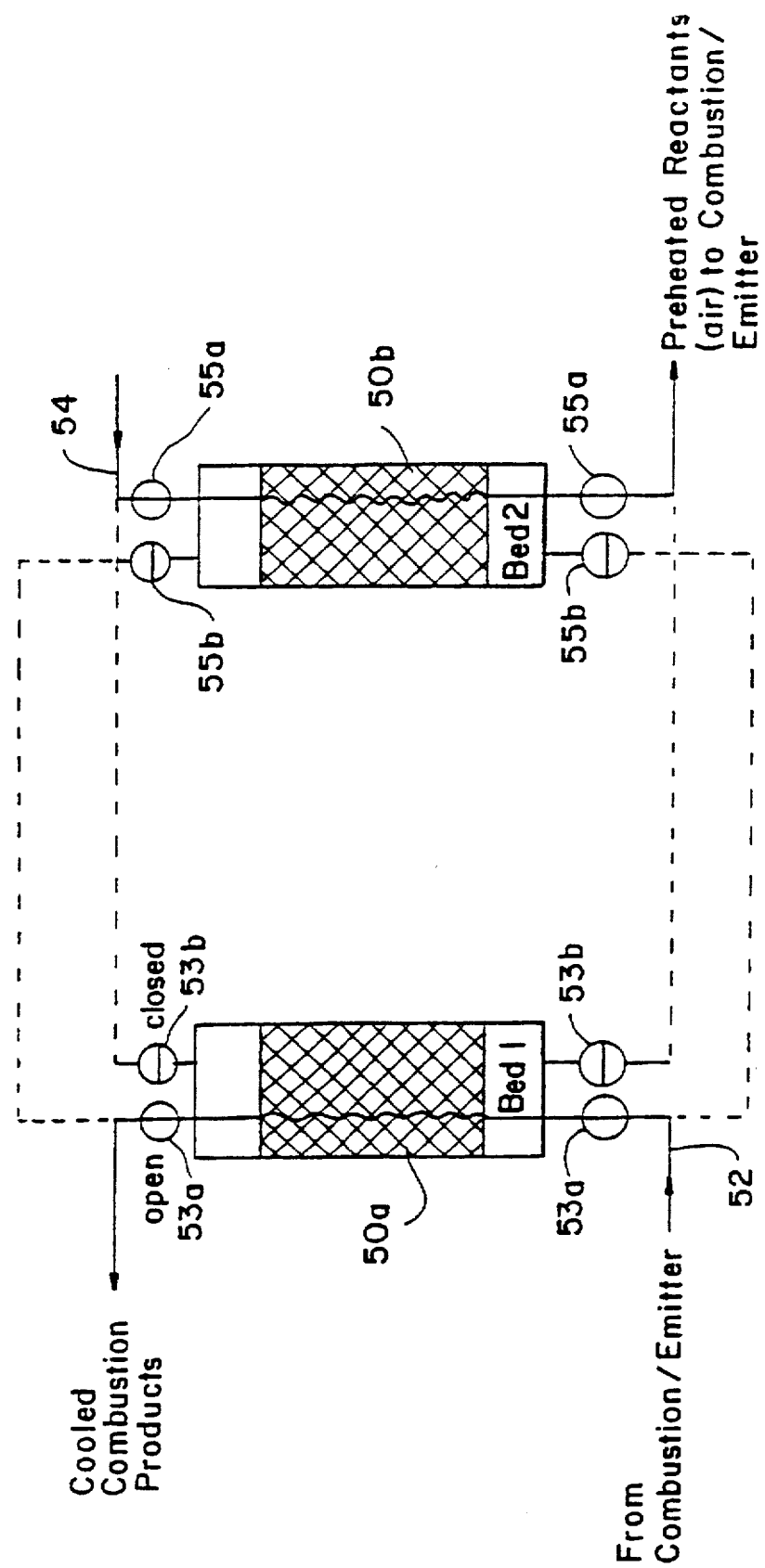
FIG. 7 shows a valve periodic flow-type heat exchanger which may be used in accordance with the TPV system of the present invention.

Examples of two types of heat exchangers (regenerators) useful in the present invention are depicted in FIGS. 6 through 7. FIGS. 6a and 6b show periodic-flow-type heat exchangers. Two rotary types are shown, an axial flow rotary (FIG. 6a) and a radial flow rotary (FIG. 6b). In the axial flow type shown in cross-section in FIG. 6a, a ceramic matrix in the form of a wheel 30 is shown. Wheel 30 rotates on an axle 32 about an axis therethrough. The ceramic wheel 30 rotates about the axis at a given rpm. Combustion products from the combustor/emitter pass through the ceramic wheel in one direction as shown at 34. Incoming reactants are preheated by passing them through said ceramic wheel in the opposite direction of the flow of the combustion products, as shown at 36. The preheated reactants are then directed to the combustor/emitter.

In the radial flow heat exchanger, shown in cross-section in FIG. 6b, a ceramic matrix cylinder 40 rotates about an axis on axle 42. The rotating cylindrical ceramic matrix is housed in chamber 44. Combustor products from the combustor/emitter are brought in at opening 46 and directed into one segment of the cylinder bore 48. The combustion products then pass through the cylinder wall 48a and are directed outwardly. Concurrently, reactants are preheated by passing a stream of a reactant mixture 49 through the wall of said ceramic cylinder at 48b, preheated and directed to the combustor/emitter for combustion.

In each of the above rotary type heat exchangers, the ceramic matrix may be a reticulated foam or an array of microtubes as further described herein.

A valve-type oscillating heat exchanger is shown in FIG. 7. As shown in this figure, two ceramic matrices 50a and 50b which may be comprised of reticulated foam or a microtube arrangement, are used to preheat incoming reactants prior to their entry into the combustor/emitter. This is accomplished by passing hot combustion gases from the combustor/emitter as shown at 52 through bed 1 while valves 53a are in the open position. The hot combustion gases serve to heat the bed in preparation for reactant gases which will be subsequently passed therethrough. While bed 1 is receiving hot combustion gases, valves 53b are closed. Valves 55a and 55b in bed 2, however, are open and reactants are passed through bed 2 as shown at 54 and preheated prior to directing them to the combustor/emitter. The process is reversed periodically and the valves 53a, 53b and 55a, 55b are alternated between the open and closed position such that when bed 1 is being heated from combustion products, bed 2 is being cooled by passing heat to incoming reactants. Conversely, when bed 2 is being heated by hot combustion products, bed 1 is being cooled by incoming reactants.

Regeneration refers to oscillating heat flow such as that disclosed in U.S. Pat. No. 4,850,862 to Bjerklie, described above. In this instance, two combustors and one emitter or two combustor/emitters would be employed and combustion products generated from one combustor (or combustor/emitter) would be cycled through the emitter to an adjacent combustor (or combustor/emitter), and vice-versa. The oscillation would alternate between the combustion mode and the regeneration mode.

The heat recovery means can take forms such as those described above with respect to FIGS. 6 through 7. These heat exchangers/regenerators have compact surface area densities and may be effectively employed as the heat recovery means of the present invention.

PHOTOCHEMICAL IGNITION

The TPV system of the present invention employs a photochemical ignition system to initiate combustion. Photochemical ignition allows controllable ramping-up of the oxidant/fuel mixture temperature prior to the mixture flowing to the emitter where combustion is initiated. Ramped preheating is required for a number of reasons. In the preferred embodiments most materials should be slowly heated to prevent thermal shock and degradation of the emitter structure. Combustor start-up may begin with air/fuel reactant mixture of less than 3:1 which is ignited at a temperature of about 1,000°–1,200° C. Sufficient thermal and electric energy produced by such start-up can be used to drive the oxygen separation membrane unit 24 (FIG. 3), thereby providing oxygen which can be fed to the reactant mixture to raise the air/fuel ratio to greater than about 3:1 to boost temperature and efficiency. Additionally, photochemical ignition solves a major problem which occurs when the air/fuel ratio is greater than 3:1. For ratios greater than this, the flame extinguishes and extremely lean-burning is not possible. Using photochemical ignition, extremely high air/fuel ratios, for example, about 3:1 to about 30:1 can be achieved and flame stability maintained. Relatively low ignition energy is required as compared to spark ignition. At high temperatures, the creation of pollutants is problematic. Additionally, initiation of combustion using conventional thermal ignition, such as spark ignition, glow discharge and the like, does not readily offer means for controlling the rate of combustion or flame propagation speed as compared to photochemical control.

Photochemical ignition utilizes a source of ultra-violet energy designed to produce photodissociative photons which create a combustion intermediary species. For example, in the case of a fuel/oxygen mixture, oxygen molecules are dissociated into two oxygen atoms when irradiated with ultra-violet radiation of the appropriate wave length. Photochemical initiation is discussed in detail in U.S. Pat. Nos. 4,035,131 and 4,034,557 to Cerkanowicz. Room temperature ignition is possible by exposure to as little as 10 microjoules of ultra-violet radiation below about 2,450Å. Once the oxygen atoms are generated by the appropriate UV wavelength, the oxygen/fuel mixture is ignited, allowing for maintenance of a flame under conditions that would ordinarily be impossible. Additionally, photochemical ignition proceeds at lower temperature as opposed to the higher temperatures required in thermal ignition.

Photochemical initiation of combustion, control of initiation of combustion and control of combustion by means of irradiation by selected ultraviolet radiation can be used effectively over a wide range of pressure, temperature, flow conditions, turbulence, fuel type and stoichiometry. Furthermore, the techniques can be used to reduce the delays in the combustion initiation process and enhance mixing fuel-oxygen-diluent reactant mixtures and control combustion instabilities.

It will be evident that many different techniques as outlined above are possible. For example, a continuous, pulsed or modulated power supply may be utilized, enabling the ultraviolet radiation source to operate in various modes such as: a single flash of appropriate duration; the source being on continuously at a level of intensity sufficient to precondition the fuel-oxygen-diluent mixture in depth, and then a flash superimposed to initiate combustion; sequential flashes of appropriate interval and duration; a source continuously on and capable of initiation of combustion. Furthermore, there may be more than one ultraviolet radiation source, such as: a number of ultraviolet sources, each turned or optimized to a separate wavelength region of radiation; a number of ultraviolet sources directed to irradiate various parts of a fuel/oxidizer mixture with variation in spectral distribution and intensity of the radiant output; a number of ultraviolet sources used in sequence or phased according to a preselected timing sequence that provides varying intensities and spectral distributions of ultraviolet radiation to the reactant mixture at varying times.

There may also be varied geometric relationship between a radiation source and a combustion chamber, such as one source to one chamber, one source for many chambers, one chamber with many sources.

An important realization of the present invention is that increasing the input energy results in a pronounced effect on the reaction front propagation velocity. For example, U.S. Pat. No. 4,034,557 discloses a stoichiometric hydrogen-oxygen mixture at 300 torr pressure and room temperature was exposed to radiant energy levels which resulted from 200 to 300 joule energy inputs. The reaction front arrival time at photo-cells positioned at 7.52 cm and 12.52 cm from the radiant source window (ultraviolet grade sapphire) was interpreted to demonstrate that an increase in input energy by a factor of 10 results in reducing the reaction front arrival time approximately 50%. It is expected that a similar reduction in ignition delay can be brought about by increasing the input energy. The proposal that enhancement in depth is created by the generation of oxygen atoms is thus supported since, in the region discussed, ten times the normal oxygen atom concentration is generated for ten times the amount of energy. Increasing the input energy results in an increase in reaction front propagation velocity.

Photochemical ignition of a methane-air mixture can be made to occur at room temperature in times much less than the time involved in spark ignition and the ensuing propagating reaction front is stronger even without motion in the unburned gas. On the other hand, electric spark (thermal) ignition requires first a large temperature rise above room temperature, and propagates a weaker reaction front for similar conditions. In practice, substitution of a photochemical ignition source for a spark-ignition source should reduce the time required for combustion of the fuel charge.

An important aspect of the present invention relates to the use of photochemical ignition and combustion control within the combustion chamber of an internal combustion device for the purpose of reducing or eliminating exhaust pollutants, particularly nitric oxides. Pollution control is achieved by taking advantage of the different combustion characteristics that are possible with the photochemical method compared to the spark method. Direct control within the combustion chamber is accomplished by either initiating a rapid combustion front or ignition of fuel-lean mixtures.

Photochemical ignition can be demonstrated on a wide variety of fuels, including liquid or gaseous hydrocarbon mixtures. The ultra-violet radiation is absorbed by the oxygen molecules, as opposed to the fuel molecules. The energy required for thermal ignition is known to increase rapidly for decreasing fuel concentration, that is, when the air/fuel mixture ratio is high. Thus, in lean-burn situations, thermal ignition does not adequately support combustion and flame stability. Photochemical ignition maintains a virtually static energy requirement and allows for flame stability at extremely high air-to-fuel ratios.

The apparatus for achieving photochemical ignition comprises a UV radiation source capable of generating UV radiation at wave lengths sufficient to dissociate the oxygen molecules, as well as a means of delivering the photons to a desired location in the combustion chamber. The UV source is preferably an arc flashlamp or a laser beam. The wave length emitted should be sufficient to dissociate oxygen molecules in the air/fuel or oxidant/fuel mixture. Generally the wave length range necessary to achieve this ranges from about 1,400Å to about 2,450Å.

Figure 8A:
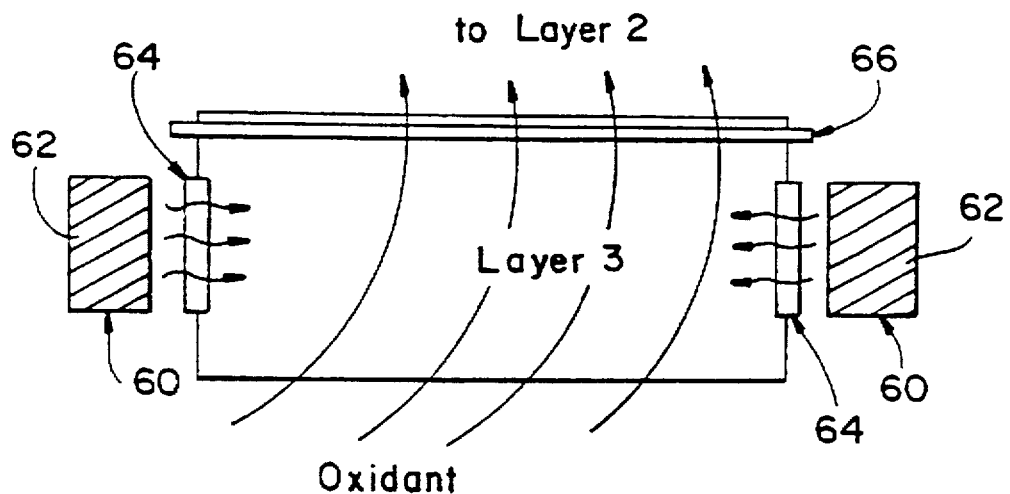
FIG. 8a shows a photovoltaic ignition system used in accordance with the TPV system of the present invention.

Referring to FIG. 8a, one embodiment of a photochemical ignition system is shown. As previously described hereinabove, the photochemical ignition system may be introduced into the combustor/emitter configurations in layer 3 as described in FIGS. 4 through 5. A cross-section of a ceramic layer of an emitter, e.g. layer 3, is shown with an adjacent photochemical emission source 60 including a power supply 62, which supplies the photochemical emission in the form of UV radiation. Intermediate said power supply 62 and ceramic layer 3 is window 64 which may be part of a collimating structure through which photochemical emissions are passed and enter ceramic layer 3. As previously mentioned, photochemical emissions may be pulsed, continuous, or otherwise modulated. As shown in the Figure, photochemical emission sources 60 may be placed at both ends of the ceramic matrix. Also fuel tube/nozzle 66, directs incoming fuel and/or reactant mixture for combustion. In operation, photochemical radiation penetrates through the vacuum ultraviolet transmissive window 64 into the combustion zone, defined by layer 3. By varying the wavelength of the emitted ultraviolet radiation, control of the flame propagation as a function of location in layer 3 (combustion zone) is possible.

The collimating structure may be a tubular structure which houses an inert gas or vacuum to properly channel the photons from the arc flashlamp or laser to the desired location in the combustion chamber. An inert gas, such as nitrogen or argon is used such that the photons will remain virtually unaffected prior to being absorbed by the oxygen molecule. Alternatively, a vacuum may be employed in place of the inert gas. The collimating means may have a reflector or lens at one or both ends to properly focus and/or distribute the wave lengths to the precise location where dissociation is to occur. Photon radiation may be continuous, pulsed or modulated depending on the design and applications intended. Pulsing may be preferred in instances where energy must be conserved to produce overall efficiency in the TPV system.

Figure 8B:
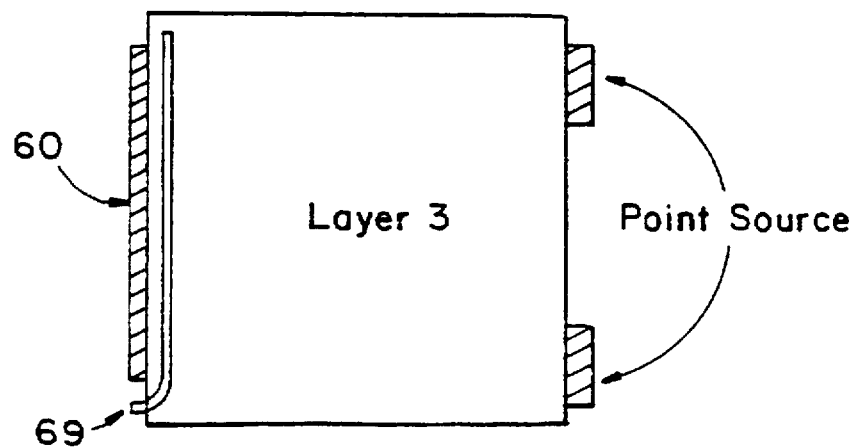
FIG. 8b shows a further embodiment of an ignition system which may be used in accordance with the present invention.

A further embodiment of the photovoltaic ignition system is shown in FIG. 8B. The photochemical ignition source 60 may be supplied by a thermal source shown by fuel rod 69.

PHOTOVOLTAIC CELL MEANS

The photovoltaic cells of the present invention may be chosen from a variety of semiconductor materials listed in columns III, IV, and V of the periodic table. In particular, Si and Ge from Group IV are well known semiconductors. However, more recently the focus has been on binary compounds resulting from combining elements from the various groups. For example, elements from Group III, Al, Ga, have been combined with Group V elements, P, As, and Sb, wherein this combination produces high performance photovoltaic cells. In particular, the following combinations are particularly useful: GaAs, GaSb, and InP. In addition to the binary combinations, ternary compounds have also produced high performance photovoltaic devices. These ternary compounds include AlGaAs, GaInAs, GaAsP, and InGaP$_2$.

The photovoltaic cells useful in the present invention may be single, multiple junction, or tandem structures made from the above-mentioned elements and having a bandgap which is tailored. For example, the bandgap may be engineered and typically in the range from about 0.4 eV to about 1.5 eV and preferably about 0.45 eV to about 1.1 eV.

It is known that photovoltaic cells are affected by temperature. They are most efficient at low temperatures, as determined by their material properties. All cell materials lose efficiency as the operating temperature rises. Thus, efficient removal of heat from the photocell and proper exposure to incoming radiation is required in order to maintain the cell's efficiency. The present invention incorporates a heat exchanger means for cooling the photocell and reclaiming thermal losses which can be recycled back into the combustion zone. The heat exchanger means may vary depending on the TPV application. Preferably, however, it is comprised of a microheat pipe structure, without porous walls. By rapidly and efficiently removing heat which results from incident radiation from the emitter, away from the photocell, cell efficiency can be enhanced.

As previously mentioned, photovoltaic cells useful in the present invention include both low-bandgap as well as high-bandgap cells. These bandgap ranges can be engineered by appropriate tailoring using single-junction, multi-junction or tandem (monolithic) cells. Bandgap engineering can be used to create the desired TPV photocell matched to the emitter temperature in the range of 900° C. to 2,000° C. Typically, these cells are fabricated by growing the photovoltaic junctions in multi-layer epitaxial reactors or by forming the junctions by diffusion without epitaxy.

Antireflection technologies in the form of coatings for photovoltaic cells may be used to help reduce reflection of the desirable wavelengths of the incident radiation, thereby minimizing the amount of light reflected away from the cell's surface. Single or multiple layers of coatings may be used, to produce antireflection at a wide range of wavelengths. Additionally, cell surfaces may be textured to cause reflected light to strike a second surface before it can escape, thereby increasing the probability of absorption. Finally, geometric shapes, such as pyramid shapes may be incorporated into the cell surface to bend incident light such that it is reflected back and forth within the cell until completely absorbed.

Optionally, coupled to the photovoltaic cell may be a filtering device which selectively permits incident radiation of only a particular wavelength range to strike the cell. The filter selectively blocks longer infra-red radiation such that shorter radiation is absorbed and less thermal waste results. In the preferred embodiment, either one or more filters may be used, deposited directly on the photocell or outer substrate such as a highly transmissive sapphire or spinel layer. In another embodiment, the filter may be deposited directly on the emitter.

These filters are predominantly made from (1) multi-layer dielectric stacks, (2) dielectric-metal-dielectric stacks, or (3) transparent conducting oxide (TCO) coatings. Any combination of these three may be used. TCO films particularly exhibit the optical characteristics required for TPV because they exhibit high transmittance of short wavelengths to high reflectance in the near infra-red. In addition, texturing may be used for TCO films to reduce angular dependence of the optical properties. Use of TCO films alone or in combination with other coatings, for example, such as MgF$_2$, is contemplated.

OXYGEN SEPARATION MEMBRANE

In an effort to eliminate polluting emissions from the combustion process, it is preferred that pure oxygen be used as the oxidant in the fuel mixture. One embodiment of the present invention includes a means for producing oxygen using dense-ceramic solid electrolyte membranes. These membranes are particularly useful to produce pure oxygen from air, which can then be used in a mixture with the fuel for combustion. Pure oxygen is preferred at higher temperatures, since nitrogen-containing gases such as air produce NO$_x$ emissions at temperatures above about 1,000° C. The solid electrolyte oxygen separation membranes are made from materials which have oxygen vacancies in the crystal lattice. Oxygen ions jump from vacancy-to-vacancy across the membrane, driven either by a pressure differential across the membrane, or by an externally imposed electrical gradient. Such an electrical gradient may be supplied by the TPV system. These membranes permit only oxygen to pass through them, thereby excluding other components of air. Oxygen-conductors are mainly found among oxide materials having a fluorite, distorted fluorite, or perovskite structure. Conduction of the oxygen occurs when oxygen vacancies are created in the lattice structure through the introduction of dopants or defects. For example, zirconium oxides, bismuth oxides, cerium oxides, and perovskites are materials which have been successfully used as oxygen conductors.

Figure 10:
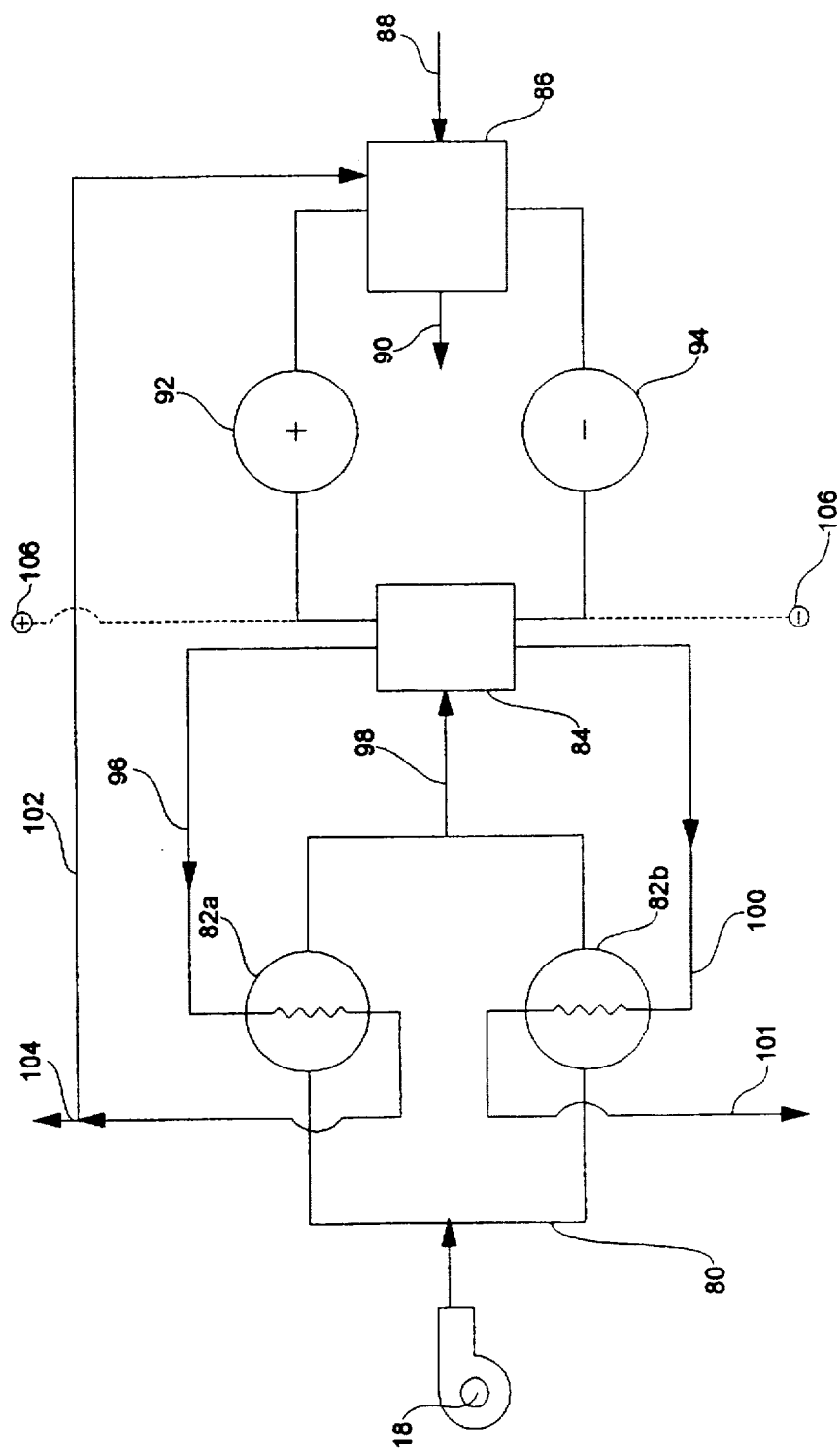
FIG. 10 shows a further embodiment of oxygen separation unit of the present invention shown in FIG. 3.

Referring now to FIG. 10, air fan 18 introduces a gaseous mixture such as, for example, air containing 21 volume percent oxygen through heat exchangers 82a and 82b where the air is heated. The oxygen molecules in the heated air are directed via line 98 and diffused through the means for separating oxygen 84, such as, for example, a membrane. While in membrane 84, the oxygen molecules are dissociated and reduced to oxygen radicals under an electro- or pressure driven gradient. Oxygen ions are then transported through vacancies within the crystal lattice of the membrane. Before exiting the membrane 84 each oxygen radical reassociates to form a pure oxygen molecule and is desorbed from the opposite side of the membrane. The pure reassociated oxygen molecules are then returned to the heat exchanger 82a via line 96 where their thermal energy is released to preheat incoming air. The pure oxygen may be collected and stored via line 104 or delivered back to the TPV system via line 102. In a similar fashion, the oxygen depleted stream 100 is directed to the heat exchanger 82b to recover thermal energy for preheating incoming air stream 80, and is exhausted via line 101 or captured for other purposes. For example, the process may produce nitrogen or other gases which can be captured and used via line 101. In this embodiment, fuel 88 is introduced to the TPV system 86. Electricity generated from the TPV system 86 can be used to drive either the oxygen module 84 and/or harvested for other purposes as indicated via lines 106. Similarly, oxygen produced by oxygen module 84 can be used as an oxidant for TPV system 86 as shown via line 102 and/or harvested for other purposes as shown via line 104. References 92 and 94 in FIG. 10 refer to positive and negative terminals, respectively, emanating from TPV system 86, which supply electricity to power the oxygen module in the case where an electric gradient membrane is used in the module. In instances where the oxygen module uses a pressure driven membrane, electricity from these terminals would be used to power an air compressor (not shown) to provide the pressure gradient to the oxygen module.

Thus, in one embodiment of the invention, air containing 21 volume percent of oxygen, passes over a zirconia-doped membrane. This membrane is sandwiched between, for example, electronically conductive porous electrodes. Oxygen molecules then diffuse through the porous cathode to the zirconia-cathode interface. At or near this area, oxygen molecules are dissociated from diatomic molecules to single oxygen ions with a negative valence of two. The electrons are supplied by a DC power supply through the porous electrode. The potential gradient applied by the power supply drives the oxygen ions into the membrane through the surface oxygen vacancies in the crystal lattice structure of the membrane. The oxygen ions move through the membrane from vacancy to vacancy until they arrive at the zirconia/anode interface. Here the electrons are given up and are recycled into the power supply. At the same time, the diatomic oxygen molecules are reformed.

Figure 9:
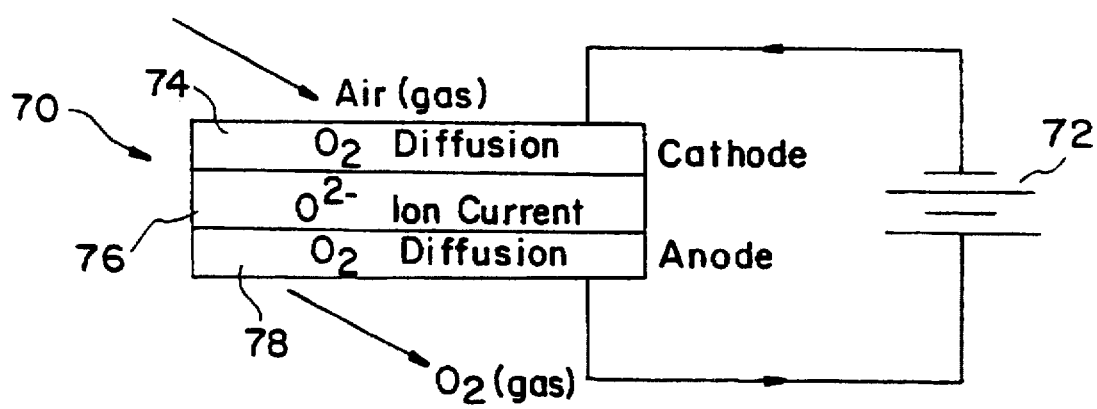
FIG. 9 shows an embodiment of the oxygen separation unit of the system of the present invention shown in FIG. 3.

As mentioned above, separation of oxygen from an incoming air stream may occur in oxygen-separation unit 24 (FIG. 3) under pressure, electrical current or other means. An example of use of electrical current is an oxygen separation unit as shown in FIG. 9, where a solid-state zirconia electrolyte cell 70 is shown.

The energy necessary to drive the separation process is supplied by the power supply 72. Oxygen in the air diff-uses through the cathode 74 to the cathode-electrolyte interface. Under the influence of the applied voltage, oxygen molecules are dissociated and reduced to oxygen ions, $O^{2-}$. As an ionic species, oxygen enters the crystal lattice 76 of the electrolyte and moves toward the anode 78. At the anode, each ion gives up its two electrons which then enter the anode and return to the power supply 72, completing the circuit. The oxygen atoms recombine into $O_2$ and diffuse out through the anode 78. Because the zirconia conducts only oxygen ions, the gas on the output (anode) side of the cell is pure oxygen. The following equation describes the reaction:

$$O_2 \text{ (gas 0.2 atm)} + 4e- \text{ (cathode)} \rightarrow 2O^{2-} \text{ (electrolyte)}$$

$$2O^{2-} \text{ (electrolyte)} \rightarrow O_2 \text{ (gas 1.0 atm)} + 4e- \text{ (anode)}$$

To impart oxygen ion conductivity to the oxygen conducting material, pure zirconia ($ZrO_2$) must be doped with another oxide such as compound such as calcium, yttrium and ytterbium. Similarly, several oxides may be used as dopants including $La_2O_3$, $Pr_2O_3$, $Sm_2O_3$, $Eu_2O_3$, $Gd_2O_3$, $Tb_2O_3$, $Y_2O_3$, $Er_2O_3$, $Lu_2O_3$, and $Sc_2O_3$. Each dopant cation ($Ca^{2+}$ or $Y^{3+}$) replaces $Zr^{4+}$ ion; the net result is that the doped crystal is electrically neutral without having all oxygen ion sites filled. These oxygen ion vacancies impart in the substance an appreciable oxygen ion conductivity. Because the ionic conductivity is a strong function of temperature, the typical operating temperature of solid-state zirconia electrolyte cells is 1,000° C.

Separation of oxygen from air or other oxygen-containing gases by the solid-state zirconia electrolyte technique has several advantages over traditional methods of separation like cryogenic distillation or pressure-swing adsorption. Separation of oxygen by solid-state zirconia electrolyte technology lends itself well to modular construction, and thus is easily scaled. Oxygen separation cells can be stacked, forming a multi-cell stack; multiple stacks can be manifolded together to form a multi-stack module. The modularity inherent in the technology also simplifies maintenance procedures.

The above equation indicates that transfer of four electrons is required to conduct each oxygen molecule ($O_2$) through the electrolyte. Thus it is a simple matter to control the rate of oxygen production by controlling the current applied to the cells. This feature reduces the storage requirements of oxygen separation units and allows operators to better match production to demand. On a small scale, solid electrolyte cells could be used to meter precise amounts of oxygen to partial oxidation processes.

The basic solid electrolyte separation cell has no moving parts. This fact contributes to the high inherent reliability of the technology. The lack of moving parts, combined with the continuous, rather than batch, nature of the process result in a quiet, vibration-free system. Because the separation of oxygen from air by a solid-state zirconia electrolyte cell is an electrochemical process, the oxygen output stream is 100 percent oxygen. Other separation schemes, such as cryogenic distillation or pressure swing adsorption, cannot produce oxygen of this purity due to the basic processes used.

In addition to the previously described membranes, bismuth oxide may also be used because it also has a large number of moving ions and allows oxygen to move easily from site-to-site. High mobility indicates efficient diffusion and low activation energy for movement.

The membranes may comprise electronic and ionic conduction, sometimes referred to as mixed conduction. With electrical conduction, an external electric current is applied to cause the diffusion of the ions. Materials that are predominantly electronic conductors are classified as semiconductors. Materials which are dominated by ionic conduction are generally referred to as solid electrolytes. It is preferred that the materials of the present invention be of the solid electrolyte type, that is they possess characteristics of only ionic conduction. In mixed conduction materials, pressure is required to effectuate oxygen separation. This requires that the electrical and ionic fluxes be essentially equal. Depending on the nature of the material, electrical or ionic conductivity of the material can be rate-limiting.

In such mixed conduction membrane materials, high pressure is applied to one surface of the membrane. This high pressure causes the oxygen molecules in the air stream to absorb onto the membrane surface and at the same time disassociate into oxygen ions. These oxygen ions are then transported through the crystal lattice structure of the membrane. On the opposite surface of the membrane, the oxygen ions reassociate into oxygen molecules and are desorbed therefrom. Such oxygen molecules are pure and can be harvested for commercial purposes. Also, these oxygen molecules may be used in the TPV system.

Several mixed-conducting materials exist which are similar to stabilized zirconias. For example, 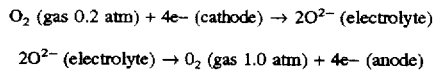

$La_{0.7}Ca_{0.3}AlO_{3-x}$ and $CaTi_{0.95}Mg_{0.05}O_{3-x}$ are examples of such materials. Additionally, other materials which have been shown to be useful as oxygen-separation membranes include the perovskite $La_{1-x}Sr_xCoO_{3-\delta}$, as well as $La_{1-x}Sr_xCo_{1-y}Fe_yO_{3-\delta}$.

The oxygen-conducting electrolyte materials possess a variety of physical and chemical properties in addition to their ability to conduct oxygen. For example, among these properties include chemical stability and strength, thermal shock resistance, gas tightness and compatibility with other materials in the TPV system. These membranes may be self-supported or used in combination with supports or other layers of membrane. Alternatively, the solid electrolyte can be used as a thin layer over the surface of a much thicker, porous support. It is critical that the membrane be totally selected for oxygen. Thus, pin holes in the surface would destroy such selectivity, since these voids would allow ions other than oxygen to diffuse. The oxygen flux per unit area of membrane is directly proportional to membrane conductivity and inversely proportional to the thickness. In forming an oxygen membrane, the membrane support structure can be extruded and sintered, then coated with an ion-conducting separatory layer of yttria-stabilized zirconia, bismuth oxide or perovskite. This layer would be prepared either by chemical/electrochemical vapor deposition, tape casting, slip casting or other conventional methods used in preparing porous-ceramic membranes. In addition to the aforementioned materials, it is also believed that thoria and ceria are also believed to be useful oxygen electrolyte materials.

While particular embodiments have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. A system for co-generating pure oxygen and electricity, comprising:
   a) membrane means for separating pure oxygen from a gaseous mixture;
   b) thermophotovoltaic (TPV) means for generating electricity sufficient to separate said pure oxygen from said gaseous mixture, comprising:
      i) an insulated housing containing a porous ceramic matrix and having a combustion zone for supporting combustion of a reactant mixture and for emitting radiant energy in response to said combustion,
      ii) means for injecting an incoming reactant mixture into said ceramic matrix,
      iii) ignition means to ignite said reactant mixture and propagate a combustion flame within said combustion zone;
      iv) photocell means for receiving and converting said radiant energy into electricity,
      v) heat recovery means for recovering heat of combustion and for preheating said reactant mixture,
   c) means for transferring said TPV generated electricity to said membrane means for separating pure oxygen;
   d) heat recovery means for recovering heat emitted from said means for separating pure oxygen; and
   e) means for collecting, storing, and delivering said pure oxygen.

2. A system for co-generating pure oxygen and electricity, comprising:
   a) a housing containing an emitter for emitting radiant energy in response to combustion and a combustion zone for supporting combustion of at least one reactant;
   b) means for injecting reactant into said combustion zone;
   c) ignition means to ignite said reactant and propagate a combustion flame within said combustion zone;
   d) photocell means for receiving and converting said radiant energy into electricity;
   e) heat recovery means for recovering heat of combustion and for preheating a reactant, an oxidant, or a mixture thereof;
   g) membrane means for separating pure oxygen from a gaseous mixture and delivering a portion of said oxygen as an oxidant;
   h) means for recovering excess oxygen generated from said membrane means; and
   i) means for collecting, storing, and delivering said pure oxygen.

3. A device for co-generating pure oxygen and electricity in a TPV system, comprising:
   a) an oxygen separation means for separating oxygen from a gaseous mixture;
   b) a means for moving said oxygen across said separation means;
   c) thermophotovoltaic (TPV) means for generating electricity sufficient to drive said oxygen separation means;
   d) means for recovering, storing, and delivering said oxygen.

4. The system of claim 3 wherein said oxygen separation means comprises:
   a) an oxygen conductor having a crystal lattice structure;
   b) means for producing oxygen vacancies within said crystal lattice structure for separating oxygen ions from said gaseous mixture.

5. The system of claim 4 wherein said oxygen conductor is selected from the group consisting of solid electrolyte materials or mixed conducting materials.

6. The system of claim 4 wherein said solid electrolyte materials are selected from dense ceramic solid electrolyte membranes.

7. The system of claim 6 wherein said electrolyte membranes are selected from the group consisting of zirconium oxide, bismuth oxide, cerium oxide, and perovskites.

8. The system of claim 5 wherein said means for producing oxygen vacancies in said oxygen conductor is selected from the group of calcium, yttrium, and ytterbium.

9. The system of claim 5 wherein said mixed conductor materials are selected from the group consisting of $CaTi_{0.7}Al_{0.3}O_{3-x}$, $La_{0.7}Ca_{0.3}AlO_{3-x}$, $CaTi_{0.95}Mg_{0.05}O_{3-x}$, $La_{1-x}Sr_xCoO_{3-\delta}$, and $La_{1-x}Sr_xCo_{1-y}Fe_yO_{3-\delta}$.

10. The system of claim 3 wherein said means for moving oxygen across said separation means comprises means for inducing a pressure differential across said oxygen separation means.

11. The system of claim 3 wherein said means for moving oxygen across said separation means comprises means for providing an electric current across said oxygen separation means to drive said separation.

12. The system of claim 11 wherein said electric current is generated from said TPV means.

13. The system of claim 3 wherein said TPV means comprises:
   a) an insulated housing containing a porous ceramic matrix and having a combustion zone for supporting combustion of a reactant mixture and for emitting radiant energy in response to said combustion;
   b) means for injecting an incoming reactant mixture into said ceramic matrix;

c) ignition means to ignite said reactant mixture and propagate a combustion flame within said combustion zone;

d) photocell means for receiving and converting said radiant energy into electricity;

e) heat recovery means for recovering heat of combustion and for preheating said reactant mixture.

14. In a TPV system, a means for co-generating pure oxygen and electricity, said means comprising:

a) a dense ceramic solid electrolyte membrane interspersed with dopants;

b) a gradient means for moving oxygen across said membrane; and c) TPV means for supplying electricity to said means for generating pure oxygen;

d) means for recovering, storing, and delivering said pure oxygen.

15. The system claim 14 wherein said electrolyte material is selected from the group consisting of zirconium oxide, bismuth oxide, cerium oxide, and perovskites.

16. The system of claim 14 wherein said dopants are selected from the group consisting of calcium, yttrium, and ytterbium.

17. The system of claim 14 wherein said gradient is a pressure gradient.

18. The system of claim 14 wherein said gradient is an electrical gradient.

19. The system of claim 14 wherein said means for supplying electricity comprises:

a) an insulated housing containing a porous ceramic matrix and having a combustion zone for supporting combustion of a reactant mixture and for emitting radiant energy in response to said combustion;

b) means for injecting an incoming reactant mixture into said ceramic matrix;

c) ignition source means to ignite said reactant mixture and propagate a combustion flames within said combustion zone;

d) photocell means for receiving and converting said radiant energy into electricity;

e) heat recovery means for recovering heat of combustion and for preheating said reactant mixture.

20. A TPV system for co-generating pure oxygen and electricity, comprising:

a) a chamber containing an emitter made of a material selected from the group consisting of ceramics, metals, and combinations thereof and a combustion zone for supporting combustion of at least one reactant;

b) means for providing a reactant mixture into said combustion zone, c) ignition means to ignite said reactant mixture and propagate a combustion flame within said combustion zone;

d) photocell means for receiving and converting radiant energy into electricity;

e) heat recovery means for recovering heat of combustion and for preheating a reactant, an oxidant, or a mixture thereof;

f) means for generating pure oxygen molecules; and g) means for utilizing said electricity to drive said oxygen generation means.

21. The system of claim 20 wherein said means for generating pure oxygen molecules comprises:

a) a membrane means for separating pure oxygen molecules from a gaseous mixture;

b) an electro-gradient means for moving said oxygen molecules across said membrane, said electro-gradient means applying a voltage to said oxygen molecules in order to dissociate and reduce said oxygen molecules to oxygen radicals, said electro-gradient means further driving said oxygen radicals through said membrane from a cathode source toward an anode source, said oxygen radicals giving up two electrons which then enter said anode and said oxygen radicals recombining to form pure oxygen molecules;

c) means for selectively delivering oxygen as an oxidant in said TPV system;

d) means for collecting, storing, and delivering excess generated oxygen.

22. The system of claim 20 wherein said means for generating pure oxygen molecules comprises:

a) a membrane means for separating pure oxygen molecules from a gaseous mixture;

b) a pressure gradient means for moving said oxygen molecules across said membrane;

c) means for selectively delivering oxygen as an oxidant in said TPV system; and d) means for collecting, storing, and delivering excess generated oxygen.

23. The system of claim 20 wherein said oxidant is pure oxygen generated by said means for generating pure oxygen.

24. A method of co-generating pure oxygen molecules and electricity, comprising:

a) providing a TPV system for generating electricity;

b) separating oxygen molecules from a gaseous mixture by diffusion through a cathode to a cathode-electrolyte interface;

c) applying a voltage generated from said electricity to dissociate and reduce said oxygen molecules to oxygen ions;

d) moving said oxygen ions through said membrane toward an anode;

e) reassociating said oxygen ions into pure oxygen molecules and charging said anode with two electrons liberated from each oxygen ion during said reassociation;

f) providing said reassociated oxygen molecules as oxidants in said TPV system;

g) collecting excess reassociated oxygen molecules for commercial application.

25. A method of co-generating pure oxygen molecules and electricity, comprising:

a) providing a TPV system for generating electricity;

b) separating oxygen molecules from a gaseous mixture by application of a pressure gradient across a mixed conduction membrane, whereby said oxygen molecules diffuse and are absorbed onto said membrane and are dissociated into oxygen ions;

c) moving said oxygen ions through vacancies in a crystal lattice of said membrane;

d) reassociating said oxygen ions into pure oxygen molecules and desorbing said oxygen ions from said membrane;

e) providing said reassociated oxygen molecules as oxidants in said TPV system;

f) collecting excess reassociated oxygen molecules for commercial application.

\* \* \* \* \*